United States Patent
Marshak et al.

(10) Patent No.: US 8,583,838 B1
(45) Date of Patent: Nov. 12, 2013

(54) TECHNIQUES FOR STATISTICS COLLECTION IN CONNECTION WITH DATA STORAGE PERFORMANCE

(75) Inventors: Marik Marshak, Newton, MA (US);
Owen Martin, Hopedale, MA (US);
Alex Veprinsky, Brookline, MA (US);
Amnon Naamad, Brookline, MA (US);
Sean C. Dolan, Belmont, MA (US);
Adnan Sahin, Needham, MA (US)

(73) Assignee: EMC Corporation, Hopkinton, MA (US)

( * ) Notice: Subject to any disclaimer, the term of this patent is extended or adjusted under 35 U.S.C. 154(b) by 424 days.

(21) Appl. No.: 12/924,396

(22) Filed: Sep. 27, 2010

(51) Int. Cl.
*G06F 3/00* (2006.01)

(52) U.S. Cl.
USPC .................................. 710/18; 710/16; 710/19

(58) Field of Classification Search
None
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 7,822,939 B1 | 10/2010 | Veprinsky et al. | |
| 2006/0218364 A1* | 9/2006 | Kitamura | 711/162 |
| 2009/0070541 A1 | 3/2009 | Yochai | |
| 2011/0119426 A1* | 5/2011 | Boyle et al. | 711/3 |

OTHER PUBLICATIONS

U.S. Appl. No. 12/798,097, filed Mar. 30, 2010, Naamad et al. for "Analysis Tool for a Multi-Tier Storage Environment".
U.S. Appl. No. 12/803,571, filed Jun. 30, 2010, Marshak et al. for "Techniques for Automated Evaluation and Movement of Data Between Storage Tiers".

* cited by examiner

Primary Examiner — Idriss N Alrobaye
Assistant Examiner — Zachary K Huson
(74) Attorney, Agent, or Firm — Muirhead and Saturnelli, LLC

(57) ABSTRACT

Described are techniques for tracking activity for one or more devices. Each of the one or more devices is partitioned into one or more extents. Each of the one or more extents includes a plurality of sub extents. Each of the sub extents includes a plurality of chunks. For each of said one or more extents of each of said one or more devices, extent activity level information is determined including one or more metrics indicating an activity level for said each extent; and For each of said one or more extents of each of said one or more devices, an activity bitmap is determined. The activity bitmap includes an entry for each sub extent included in said each extent, said entry indicating an activity level for said each sub extent.

20 Claims, 21 Drawing Sheets

|     | Device 1 | Device 2 | Device 3 | Device 4 | Device 5 | ... |
|-----|----------|----------|----------|----------|----------|-----|
| DA1 | X        |          |          | X        |          |     |
| DA2 |          | X        |          |          | X        |     |
| DA3 |          |          | X        |          |          | X   |

TECHNIQUES FOR STATISTICS COLLECTION IN CONNECTION WITH DATA STORAGE PERFORMANCE

BACKGROUND

1. Technical Field

This application generally relates to data storage, and more particularly to techniques used in connection with performance information about data storage.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. Nos. 5,206,939 to Yanai et al., 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

In connection with data storage, a variety of different technologies may be used. Data may be stored, for example, on different types of disk devices and/or flash memory devices. The data storage environment may define multiple storage tiers in which each tier includes physical devices or drives of varying technologies, performance characteristics, and the like. The physical devices of a data storage system, such as a data storage array, may be used to store data for multiple applications.

SUMMARY OF THE INVENTION

In accordance with one aspect of the invention is a method for tracking activity for one or more devices comprising: partitioning each of said one or more devices into one or more extents, each of said one or more extents including a plurality of sub extents, each of said sub extents including a plurality of chunks; determining, for each of said one or more extents of each of said one or more devices, extent activity level information including one or more metrics indicating an activity level for said each extent; and determining, for each of said one or more extents of each of said one or more devices, an activity bitmap, said activity bitmap including an entry for each sub extent included in said each extent, said entry indicating an activity level for said each sub extent. Each of the one or more devices may be a thin device having a storage capacity wherein storage is unallocated for at least a first portion of said storage capacity at a point in time, said first portion corresponding to a range of addresses of said thin device not mapped to physical storage. The extent activity level information may include short term activity information and long term activity information. The short term activity information may include a first metric determined using a first decay coefficient providing a rate of decay for an activity level determined at a point in time. The long term activity information may include a second metric determined using a second decay coefficient providing a rate of decay for an activity level determined at a point in time. The first decay coefficient may specify a shorter rate of decay than said second decay coefficient. The short term activity information and said long term activity information may each include a read miss rate, a write rate, and a prefetch rate. The short term activity information and said long term activity information may be determined based on a number of operations performed by a device interface which accesses physical devices. A first of the one or more devices may include a first extent having a first sub extent with data stored on a first storage tier and a second sub extent having data stored on a second storage tier, said first storage tier being a higher performance tier than said second storage tier. For a first of said one or more extents of a first of said one or more devices, said extent activity level information for the first extent and said activity bitmap for the first extent may be used to identify one or more sub extents of said first extent for data movement between storage tiers. A first of said one or more sub extents for one of said devices may be identified as a candidate for movement from a first storage tier to a second storage tier, said second storage tier being a higher performance tier than said first storage tier. A first of the one or more sub extents for one of said devices may be identified as a candidate for movement from a first storage tier to a second storage tier, said second storage tier being a lower performance tier than said first storage tier. The method may also include determining device activity level information for each of said one or more devices, wherein said device activity level information for each of said one or more devices is used to identify a first of said devices for data movement, said extent activity level information for each extent of said first device is used to identify a first extent for data movement, and said activity bitmap for said first extent is used to identify one or more sub extents of said first extent for data movement. The devices may be included in a data storage system having a plurality of device interfaces, and for each of said device interfaces processing an I/O operation directed to a thin device, said each device interface writes an I/O trace record including thin device information for the I/O operation in a first buffer included in memory local to said each device interface. When the first buffer is full, each device interface may perform processing to flush a plurality of I/O trace records from said first buffer and aggregate activity information of said device interface for one or more thin devices as determined in accordance with said plurality of I/O trace records. Each device interface may update a master copy of activity information in global memory in accordance with said activity information of said device interface, said master copy including activity information for said plurality of device interfaces. At each sampling period for which activity information is updated for said devices, each of said plurality of device interfaces may perform processing for a portion of said one or more devices.

In accordance with another aspect of the invention is a data storage system comprising: a plurality of physical devices; a plurality of logical devices mapped to portions of said physical devices, wherein said plurality of logical devices includes one or more thin devices, each of said thin devices being partitioned into one or more extents, each of said extents being partitioned into one or more sub extents; a plurality of device interfaces used to access said plurality of physical devices; a global memory accessible to said plurality of device interfaces; and wherein each of said plurality of device interfaces services I/Os for a portion of said physical devices, each of said device interfaces including a memory comprising code stored thereon for: recording first information for each I/O serviced by said each device interface for one of said plurality of thin devices; aggregating said first information for a plurality of I/Os serviced by said each device interface and producing local aggregation information; updating a portion of said global memory including second information, said second information comprising local aggregation information for said plurality of device interfaces; and processing, at each sampling period, a portion of said second information corresponding to a portion of said plurality of thin devices to produce activity information. The activity information may include short term activity information and long term activity information. The short term activity information may include a first metric determined using a first decay coefficient providing a rate of decay for an activity level determined at a point in time, and the long term activity information may include a second metric determined using a second decay coefficient providing a rate of decay for an activity level determined at a point in time. Each of the sub extents may correspond to a portion of a physical device and may represent a smallest amount considered as a data movement candidate. The data storage system may include a plurality of storage tiers, each of said plurality of storage tiers having physical devices of different performance characteristics and including at least a first tier and a second tier wherein said first tier is a higher performance storage tier than said second storage tier, A first sub extent of one of said plurality of thin devices may be a data movement candidate having a first portion of data stored on a physical device of said first tier and a second portion of data stored on a physical device of said second tier. When the first sub extent is selected as a candidate for promotion to said first tier, said second portion may be moved to a physical device of said first tier, and when said first sub extent is selected as a candidate for demotion to said second tier, said first portion may be moved to a physical device of said second tier.

In accordance with another aspect of the invention is a computer readable medium comprising code stored thereon for tracking activity for one or more devices, the computer readable medium comprising code stored thereon for: partitioning each of said one or more devices into one or more extents, each of said one or more extents including a plurality of sub extents, each of said sub extents including a plurality of chunks; determining, for each of said one or more extents of each of said one or more devices, extent activity level information including one or more metrics indicating an activity level for said each extent; and determining, for each of said one or more extents of each of said one or more devices, an activity bitmap, said activity bitmap including an entry for each sub extent included in said each extent, said entry indicating an activity level for said each sub extent.

BRIEF DESCRIPTION OF THE DRAWINGS

Features and advantages of the present invention will become more apparent from the following detailed description of exemplary embodiments thereof taken in conjunction with the accompanying drawings in which:

FIG. 13 is an example illustrating devices assigned to different DAs for processing at each sampling period in an embodiment in accordance with techniques herein.

DETAILED DESCRIPTION OF EMBODIMENT(S)

Figure 1:
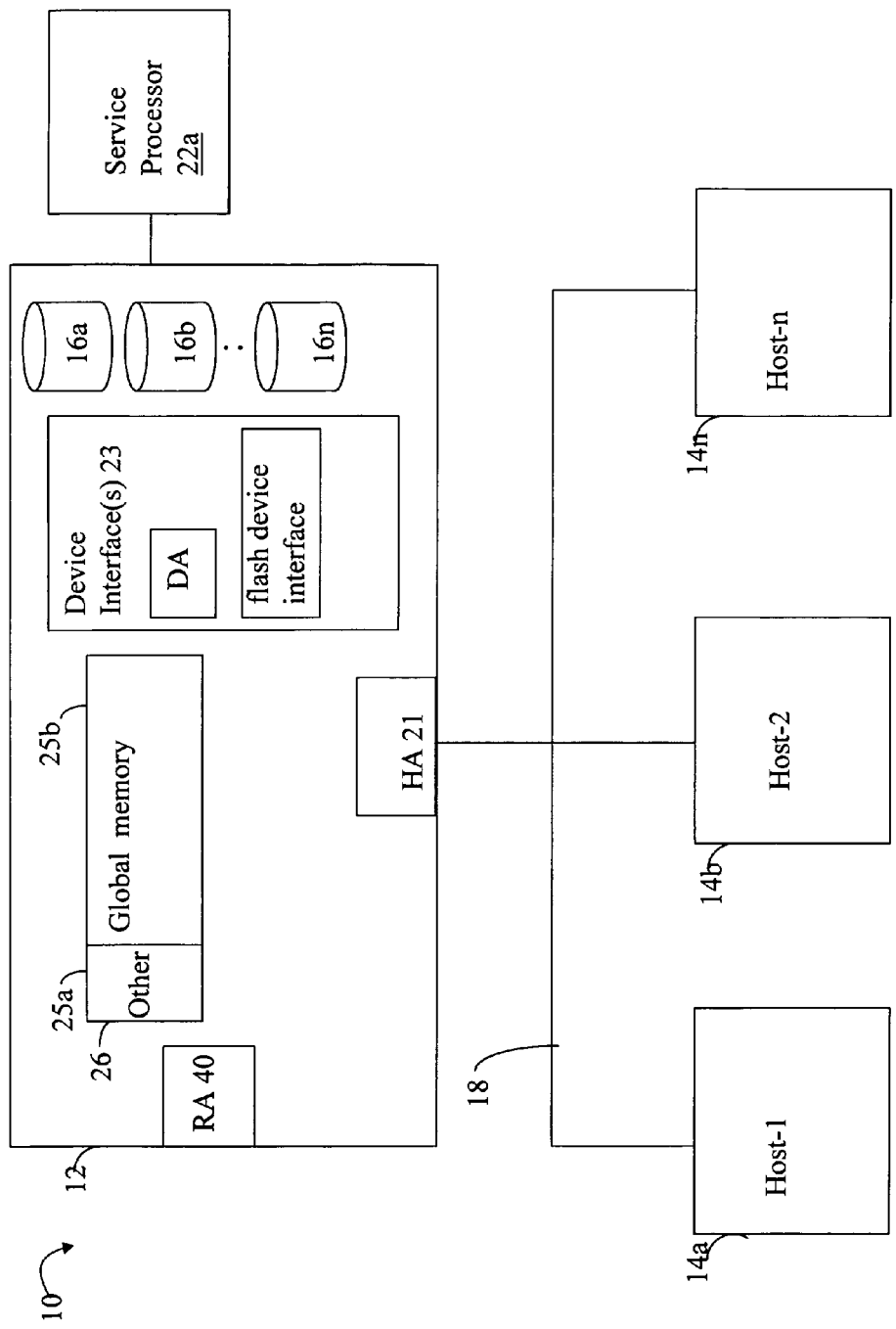
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array, may be accessed by multiple hosts allowing the hosts to share the data residing therein. Multiple logical devices or LVs may also be concatenated and appear to the host as a single metavolume. The HAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA that accomplishes the foregoing by creating job records for the different LVs associated with a particular device. These different job records may be associated with the different LVs in a data structure stored and managed by each device interface.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Additional detail regarding the service processor 22a is described in following paragraphs.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

Figure 2:
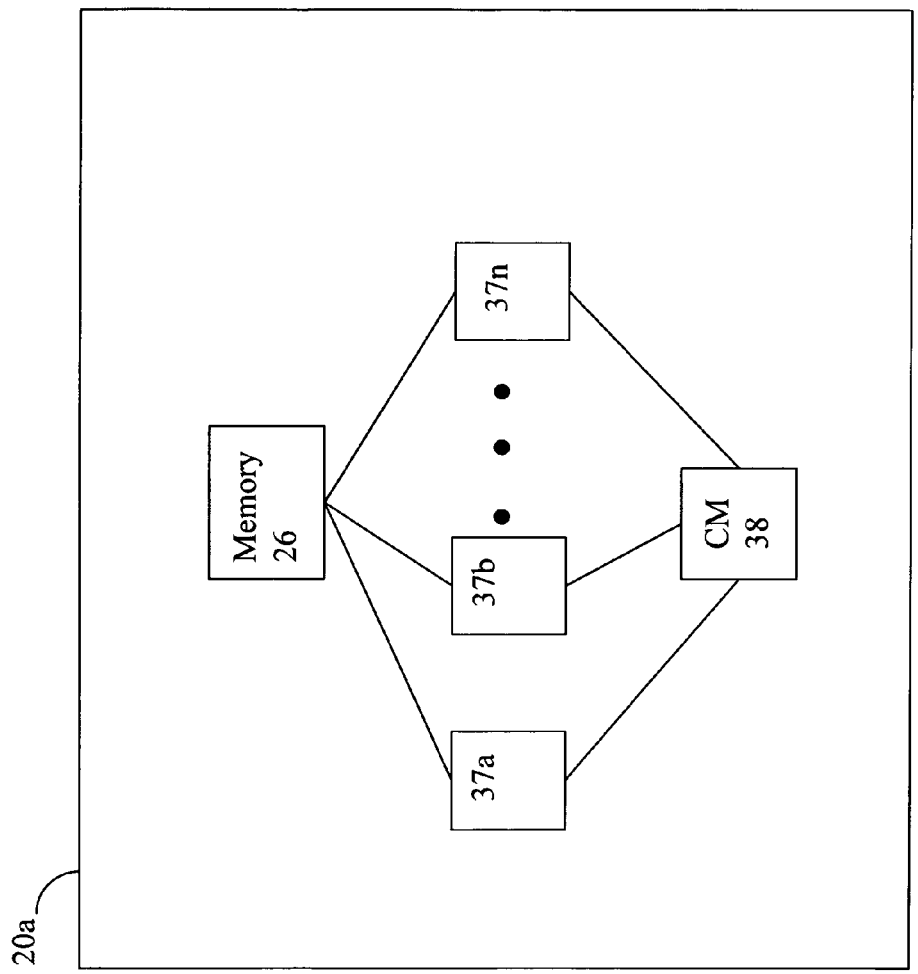
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® DMX™ data storage array by EMC Corporation of Hopkinton, Mass. In the foregoing data storage array, the data storage devices 16a-16n may include a combination of disk devices and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive (such as an FC drive, a SATA (Serial Advanced Technology Attachment) drive), and the like. Data protection may specify a type or level of data storage protection such, for example, as a particular RAID level (e.g., RAID1, RAID-5 3+1, RAIDS 7+1, and the like). Performance characteristics may relate to different performance aspects of the physical storage devices of a particular type or technology. For example, there may be multiple types of FC drives based on the RPM characteristics of the FC drives (e.g., 10K RPM FC drives and 15K RPM FC drives) and FC drives having different RPM characteristics may be included in different storage tiers. Storage capacity may specify the amount of data, such as in bytes, that may be stored on the drives. An embodiment may allow a user to define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives, and a third tier of all SATA drives. The foregoing are some examples of tier definitions and other tier definitions may be specified in accordance with techniques herein.

Figure 3:
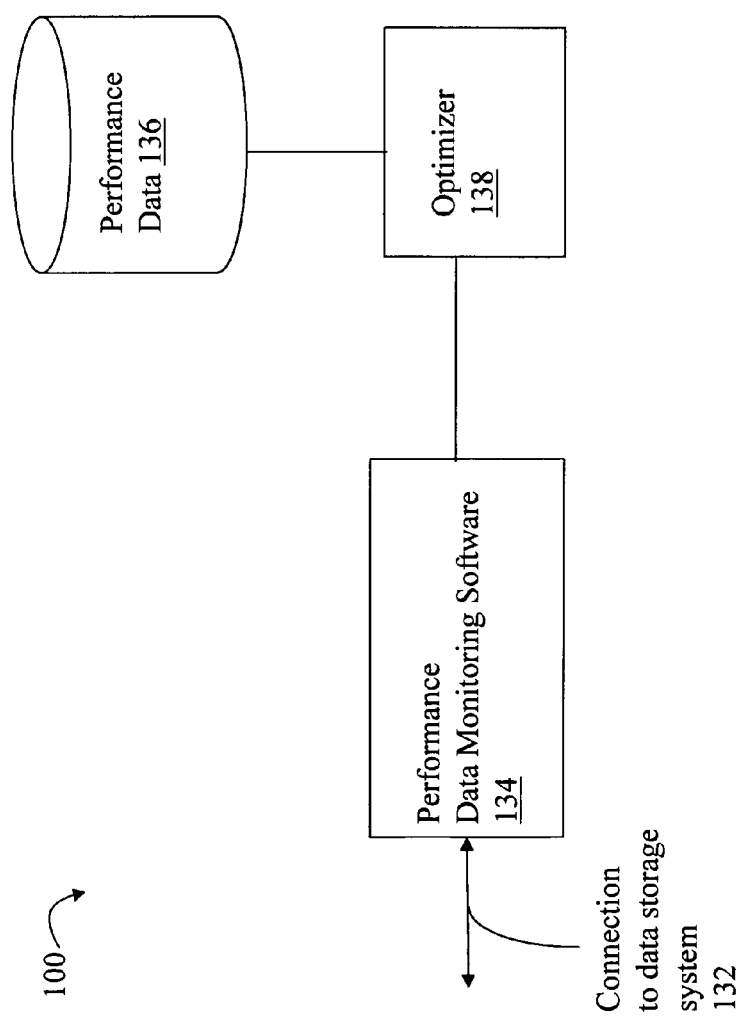
FIG. 3 is an example representing components that may be included in a service processor in an embodiment in accordance with techniques herein.

Referring to FIG. 3, shown is an example 100 of software that may be included in a service processor such as 22a. It should be noted that the service processor may be any one of a variety of commercially available processors, such as an Intel-based processor, and the like. Although what is described herein shows details of software that may reside in the service processor 22a, all or portions of the illustrated components may also reside elsewhere such as, for example, on any of the host systems 14a 14n.

Included in the service processor 22a is performance data monitoring software 134 which gathers performance data about the data storage system 12 through the connection 132. The performance data monitoring software 134 gathers and stores performance data and forwards this to the optimizer 138 which further stores the data in the performance data file 136. This performance data 136 may also serve as an input to the optimizer 138 which attempts to enhance the performance of I/O operations, such as those I/O operations associated with data storage devices 16a-16n of the system 12. The optimizer 138 may take into consideration various types of parameters and performance data 136 in an attempt to optimize particular metrics associated with performance of the data storage system 12. The performance data 136 may be used by the optimizer to determine metrics described and used in connection with techniques herein. The optimizer may access the performance data, for example, collected for a plurality of LVs when performing a data storage optimization. The performance data 136 may be used in determining a workload for one or more physical devices, logical devices or volumes (LVs), thin devices (described in more detail elsewhere herein) or portions thereof, and the like. The workload may also be a measurement or level of "how busy" a device, or portion thereof is, for example, in terms of I/O operations (e.g., I/O throughput such as number of I/Os/second, and the like).

It should be noted that the operations of read and write with respect to an LV, thin device, and the like, may be viewed as read and write requests or commands from the DA, controller or other backend physical device interface. Thus, these are operations may also be characterized as a number of operations with respect to the physical storage device (e.g., number of physical device reads, writes, and the like, based on physical device accesses). This is in contrast to observing or counting a number of particular type of I/O requests (e.g., reads or writes) as issued from the host and received by a front end component such as an FA. To illustrate, a host read request may not result in a read request or command issued to the DA if there is a cache hit and the requested data is in cache. The host read request results in a read request or command issued to the DA to retrieve data from the physical drive only if there is a read miss. Furthermore, when writing data of a received host I/O request to the physical device, the host write request may result in multiple reads and/or writes by the DA in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an FA.

As set forth in following paragraphs, described are techniques that may be used in connection with what performance data to collect for thin devices and how such information may be collected, such as in a multi-processor environment, by the optimizer 138. The optimizer 138 may also perform other processing such as, for example, to determine what particular LVs, thin devices (described in more detail elsewhere herein) and/or portions thereof, to store on physical devices of a particular tier, evaluate when to migrate or move data between physical drives of different tiers or within the same tier, and the like. It should be noted that the optimizer 138 may generally represent one or more components that perform processing as described herein as well as one or more other optimizations and other processing that may be performed in an embodiment.

Figure 4:
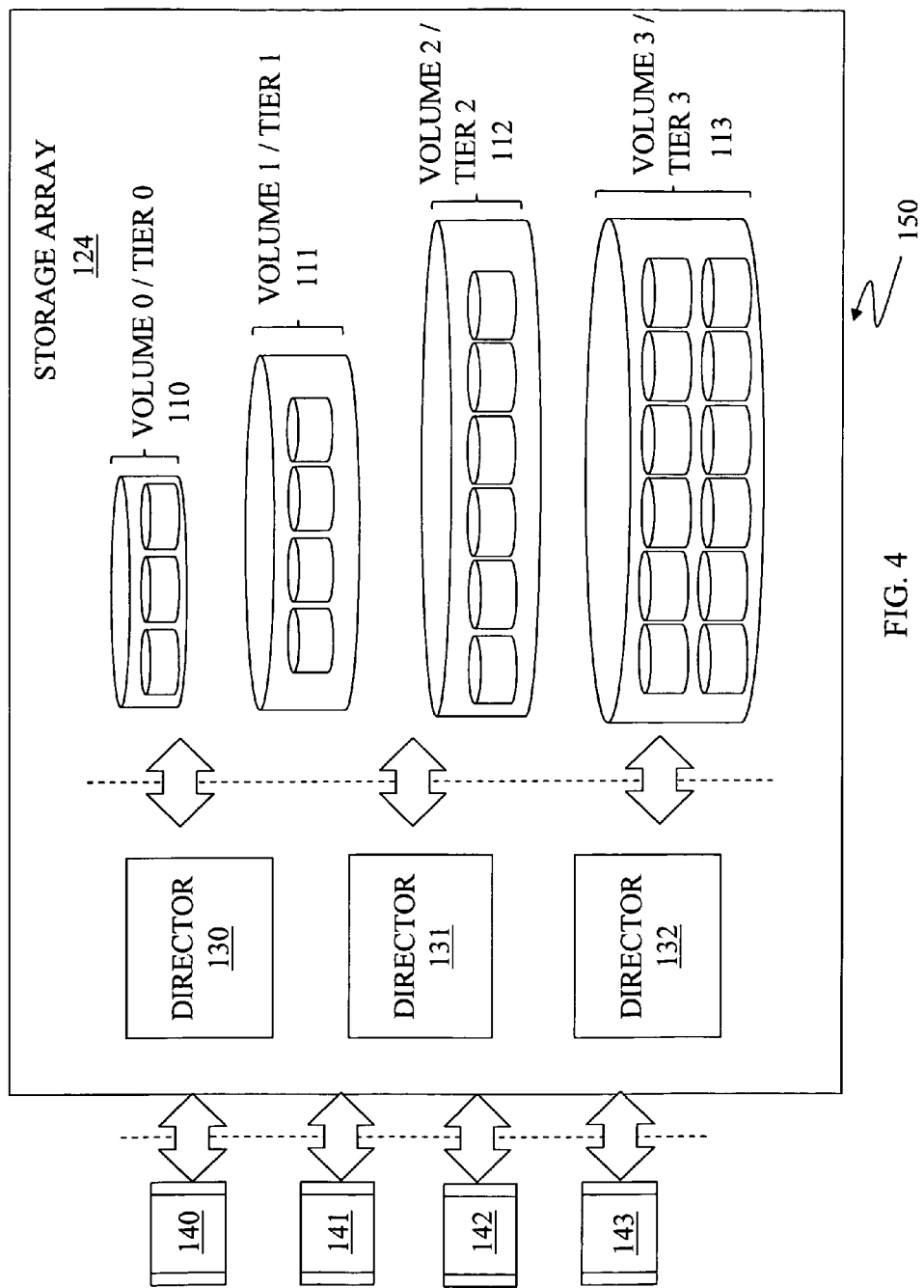
FIGS. 4, 5A and 5B are examples illustrating a data storage system, such as data storage array, including a plurality of storage tiers in an embodiment in accordance with techniques herein.

FIG. 4 is a schematic illustration showing a storage system 150 that may be used in connection with an embodiment of the system described herein. The storage system 150 may include a storage array 124 having multiple directors 130-132 and multiple storage volumes (LVs, logical devices or VOLUMES 0-3) 110-113. Host applications 140-144 and/or other entities (e.g., other storage devices, SAN switches, etc.) request data writes and data reads to and from the storage array 124 that are facilitated using one or more of the directors 130-132. The storage array 124 may include similar features as that discussed above.

The volumes 110-113 may be provided in multiple storage tiers (TIERS 0-3) that may have different storage characteristics, such as speed, cost, reliability, availability, security and/or other characteristics. As described above, a tier may represent a set of storage resources, such as physical storage devices, residing in a storage platform. Examples of storage disks that may be used as storage resources within a storage array of a tier may include sets SATA disks, FC disks and/or EFDs, among other known types of storage devices.

According to various embodiments, each of the volumes 110-113 may be located in different storage tiers. Tiered storage provides that data may be initially allocated to a particular fast volume/tier, but a portion of the data that has not been used over a period of time (for example, three weeks) may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage. In an embodiment, the system described herein may be used in connection with a Fully Automated Storage Tiering (FAST) product produced by EMC Corporation of Hopkinton, Mass., that provides for the optimization of the use of different storage tiers including the ability to easily create and apply tiering policies to transparently automate the control, placement, and movement of data within a storage system based on business needs.

Figure 5A:
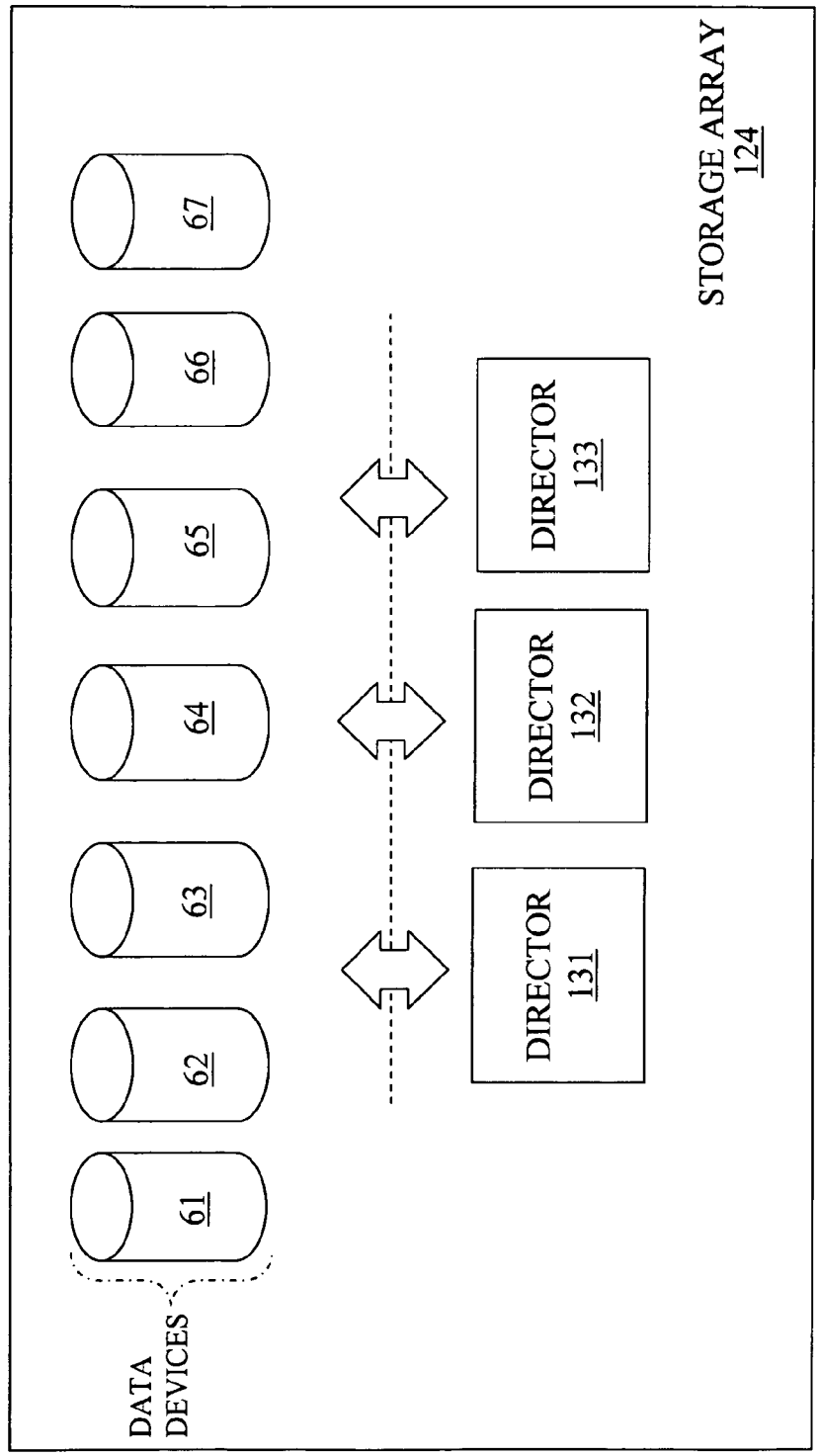

Referring to FIG. 5A, shown is a schematic diagram of the data storage array 124 as including a plurality of data devices 61-67 communicating with directors 131-133. The data devices 61-67 may be implemented as logical devices like standard logical devices (also referred to as thick devices) provided in a Symmetrix® data storage system produced by EMC Corporation of Hopkinton, Mass., for example. In some embodiments, the data devices 61-67 may not be directly useable (visible) to hosts coupled to the storage array 124. Each of the data devices 61-67 may correspond to a portion (including a whole portion) of one or more disk drives. Thus, for example, the data device section 61 may correspond to an entire disk drive or physical storage device, may correspond to a portion of the physical disk drive or other physical device, or may correspond to a first portion of a first physical device and a second portion of a different physical device. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein. Alternatively, in other embodiments that may be used in connection with the system described herein, instead of being separate devices, the data devices 61-67 may be sections of one data device.

Figure 5B:
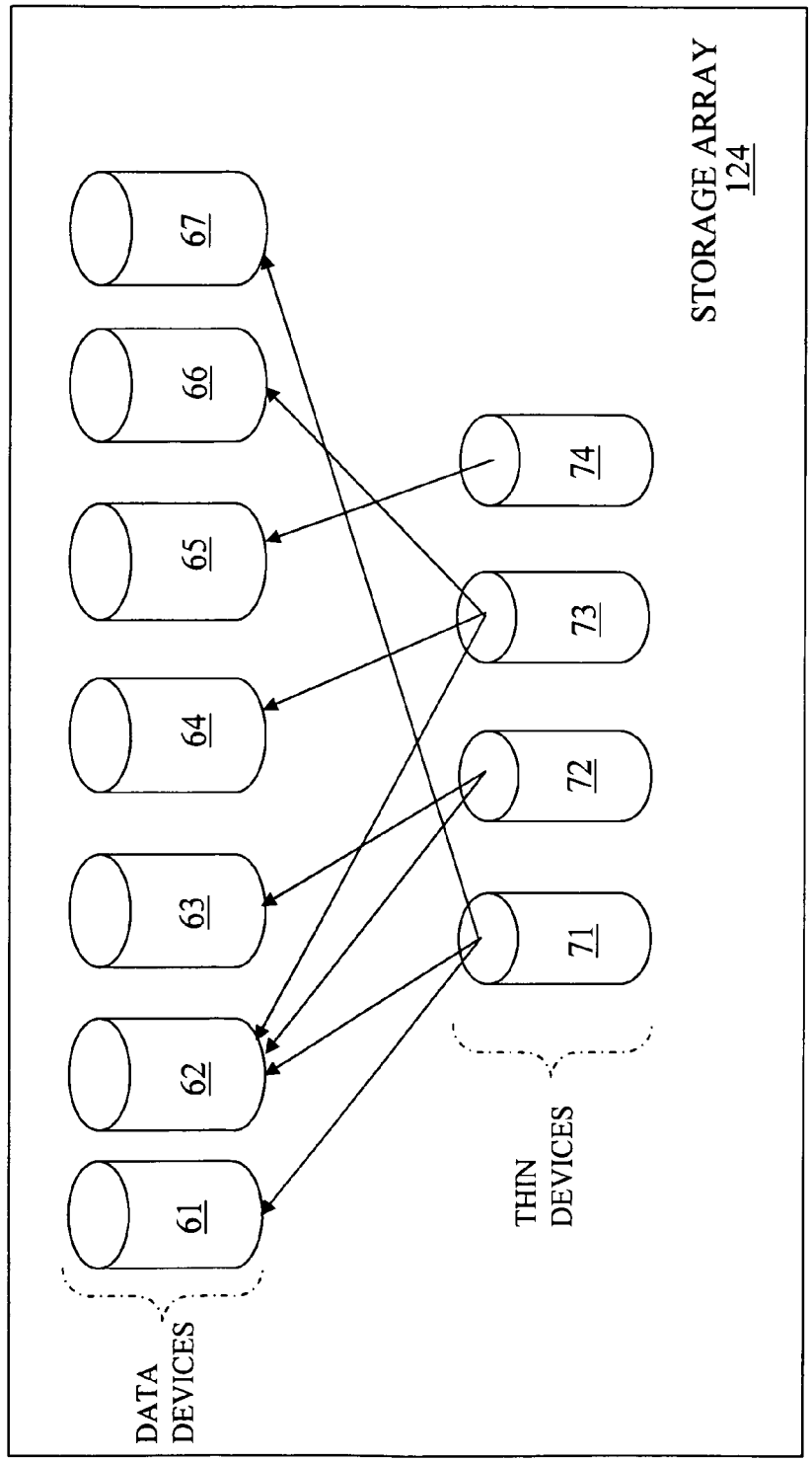

As shown in FIG. 5B, the storage array 124 may also include a plurality of thin devices 71-74 that may be adapted for use in connection with the system described herein when using thin provisioning. In a system using thin provisioning, the thin devices 71-74 may appear to a host coupled to the storage array 124 as one or more logical volumes (logical devices) containing contiguous blocks of data storage. Each of the thin devices 71-74 may contain pointers to some or all of the data devices 61-67 (or portions thereof).

Figure 5C:
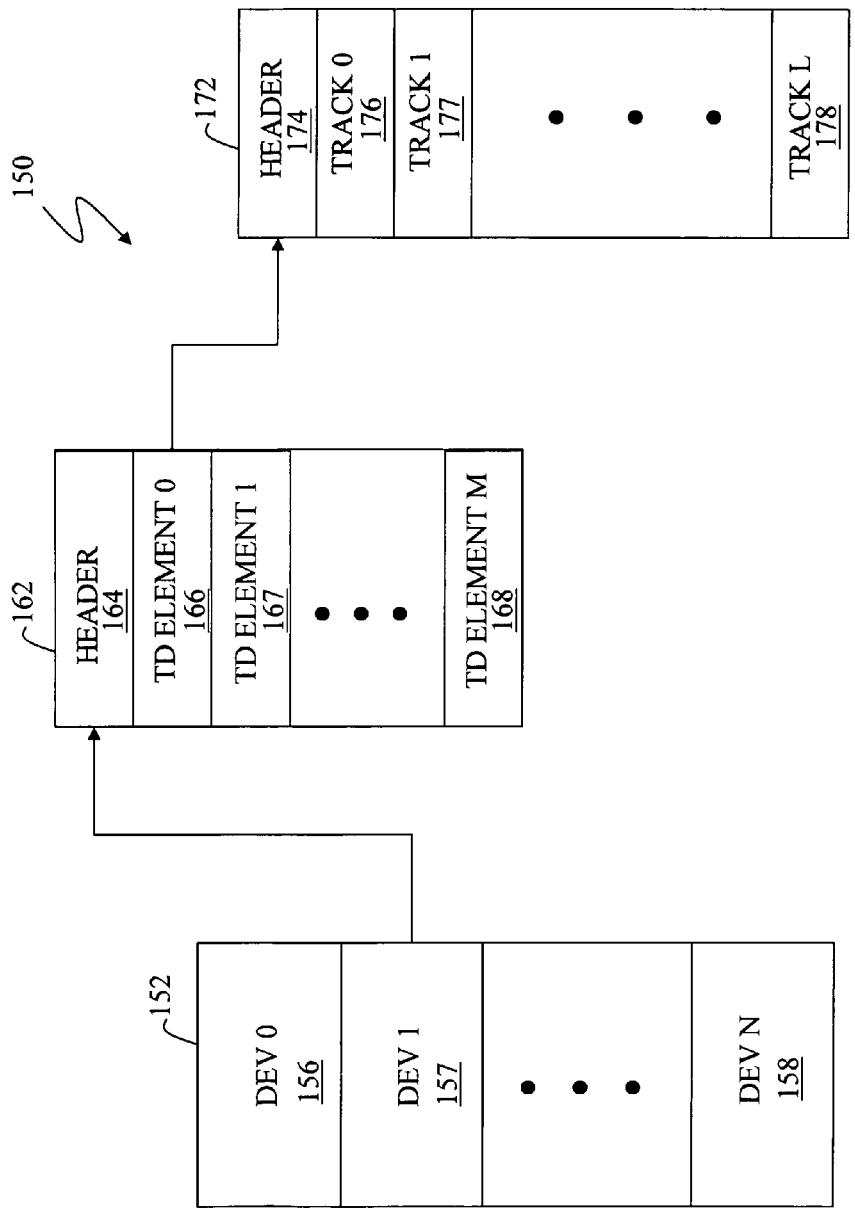
FIG. 5C is a schematic diagram illustrating tables that are used to keep track of device information in connection with an embodiment of the system described herein.

Referring to FIG. 5C, shown is a diagram 150 illustrating tables that are used to keep track of device information. A first table 152 corresponds to all of the devices used by a data storage system or by an element of a data storage system, such as an HA and/or a DA. The table 152 includes a plurality of logical device (logical volume) entries 156-158 that correspond to all the logical devices used by the data storage system (or portion of the data storage system). The entries in the table 152 may include information for thin devices, for data devices (such as logical devices or volumes), for standard logical devices, for virtual devices, for BCV devices, and/or any or all other types of logical devices used in connection with the system described herein.

Each of the entries 156-158 of the table 152 correspond to another table that may contain information for one or more logical volumes, such as thin device logical volumes. For example, the entry 157 may correspond to a thin device table 162. The thin device table 162 may include a header 164 that contains overhead information, such as information identifying the corresponding thin device, information concerning the last used data device and/or other information including counter information, such as a counter that keeps track of used group entries (described below). The header information, or portions thereof, may be available globally to the data storage system.

The thin device table 162 may include one or more group elements 166-168, that contain information corresponding to a group of tracks on the data device. A group of tracks may include one or more tracks, the number of which may be configured as appropriate. In an embodiment herein, each group has sixteen tracks, although this number may be configurable.

One of the group elements 166-168 (for example, the group element 166) of the thin device table 162 may identify a particular one of the data devices 61-67 having a track table 172 that contains further information, such as a header 174 having overhead information and a plurality of entries 176-178 corresponding to each of the tracks of the particular one of the data devices 61-67. The information in each of the entries 176-178 may include a pointer (either direct or indirect) to the physical address on one of the physical disk drives of the data storage system that maps to the logical address(es) of the particular one of the data devices 61-67. Thus, the track table 162 may be used in connection with mapping logical addresses of the logical devices corresponding to the tables 152, 162, 172 to physical addresses on the disk drives or other physical devices of the data storage system.

The tables 152, 162, 172 may be stored in the global memory 25b of the data storage system. In addition, the tables corresponding to particular logical devices accessed by a particular host may be stored (cached) in local memory of the corresponding one of the HA's. In addition, an RA and/or the DA's may also use and locally store (cache) portions of the tables 152, 162, 172.

Figure 5D:
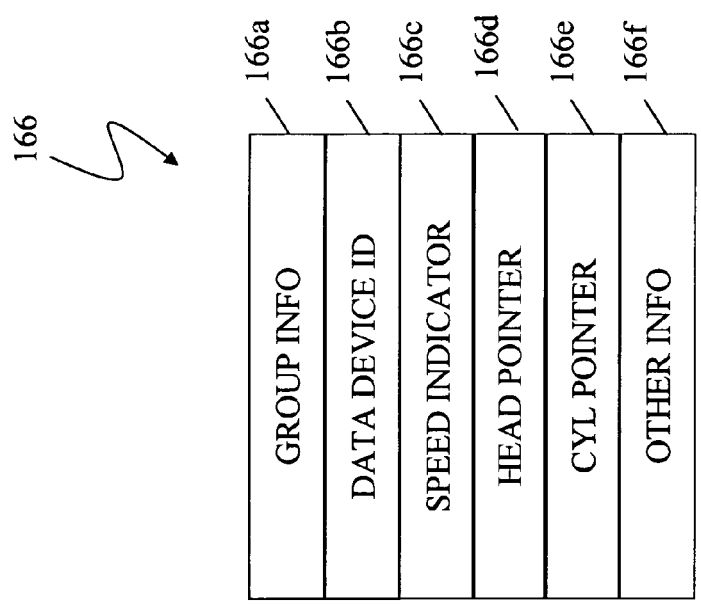
FIG. 5D is a schematic diagram showing a group element of a thin device table in connection with an embodiment of the system described herein.

Referring to FIG. 5D, shown is a schematic diagram illustrating a group element 166 of the thin device table 162 in connection with an embodiment of the system described herein. The group element 166 may includes a plurality of entries 166a-166f. The entry 166a may provide group information, such as a group type that indicates whether there has been physical address space allocated for the group. The entry 166b may include information identifying one (or more) of the data devices 61-67 that correspond to the group (i.e., the one of the data devices 61-67 that contains pointers for physical data for the group). The entry 166c may include other identifying information for the one of the data devices 61-67, including a speed indicator that identifies, for example, if the data device is associated with a relatively fast access physical storage (disk drive) or a relatively slow access physical storage (disk drive). Other types of designations of data devices are possible (e.g., relatively expensive or inexpensive). The entry 166d may be a pointer to a head of the first allocated track for the one of the data devices 61-67 indicated by the data device ID entry 166b. Alternatively, the entry 166d may point to header information of the data device track table 172 immediately prior to the first allocated track. The entry 166e may identify a cylinder of a first allocated track for the one the data devices 61-67 indicated by the data device ID entry 166b.

The entry 166f may contain other information corresponding to the group element 166 and/or the corresponding thin device. In other embodiments, entries of the group table 166 may identify a range of cylinders of the thin device and a corresponding mapping to map cylinder/track identifiers for the thin device to tracks/cylinders of a corresponding data device. In an embodiment, the size of table element 166 may be eight bytes.

Accordingly, a thin device presents a logical storage space to one or more applications running on a host where different portions of the logical storage space may or may not have corresponding physical storage space associated therewith. However, the thin device may not be mapped directly to physical storage space. Instead, portions of the thin storage device for which physical storage space exists are mapped to data devices, which are logical devices that map logical storage space of the data device to physical storage space on the disk drives or other physical storage devices. Thus, an access of the logical storage space of the thin device results in either a null pointer (or equivalent) indicating that no corresponding physical storage space has yet been allocated, or results in a reference to a data device which in turn references the underlying physical storage space.

Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, and U.S. patent application Ser. No. 11/903,869, filed Sep. 25, 2007, DATA DE-DUPLICATION USING THIN PROVISIONING, Veprinsky et al., both of which are incorporated by reference herein.

As discussed elsewhere herein, the data devices 61-67 (such as LVs or other logical devices) may be associated with physical storage areas (e.g., disk drives, tapes, solid state storage, etc.) having different characteristics. In various embodiments, the physical storage areas may include multiple tiers of storage in which each sub-tier of physical storage areas and/or disk drives may be ordered according to different characteristics and/or classes, such as speed, technology and/or cost. The devices 61-67 may appear to a host coupled to the storage device 24 as a logical volume (logical device) containing a contiguous block of data storage, as discussed herein. Accordingly, each of the devices 61-67 may map to storage areas across multiple physical storage drives. The granularity at which the storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage volumes or different sized data blocks within a single storage volume.

In accordance with techniques herein, an embodiment may allow for locating all of the data of a single logical portion or entity in a same tier or in multiple different tiers depending on the logical data portion or entity. For example, in one embodiment, all data associated with a single LV or logical device visible to the host may be located in the same tier. In an embodiment including thin devices, different portions of data of a single thin device may be located in different storage tiers. For example, a thin device may include two data portions and a first of these two data portions may be identified as a "hot spot" of high I/O activity (e.g., having a large number of I/O accesses such as reads and/or writes per unit of time) relative to the second of these two portions. As such, an embodiment in accordance with techniques herein may have added flexibility in that the first portion of data of the thin device may be located in a different higher performance storage tier than the second portion. For example, the first portion may be located in a tier comprising flash devices and the second portion may be located in a different tier of FC or SATA drives.

An embodiment in accordance with techniques herein may define a storage group (SG) of one or more devices, such as one or more thin devices. An SG may represent those devices used by an application. The application may execute, for example, on one of the hosts of FIG. 1. It should be noted that the particular number of tiers, thin devices, and the like, should not be construed as a limitation. An SG may represent a logical grouping of thin devices used by a single application although an SG may correspond to other logical groupings for different purposes. An SG may, for example, correspond to thin devices used by multiple applications.

As described elsewhere herein, the current workload may be based on actual observed performance data analyzed to determine how busy the different SGs, thin devices, or portions of such thin devices, are. For example, such performance data collected may include a number of I/O operations/unit of time (e.g., I/O throughput from the back-end/DA perspective), and the like. What will be described in following paragraphs are techniques that may be performed in connection with thin devices. The following paragraphs describe what performance data may be collected about thin devices where such information may be used, for example, in connection with evaluating workload of thin devices, and portions thereof. Such evaluation may be performed, for example, by the optimizer in order to determine what data of thin devices (or portions thereof) to locate in the different storage tiers, to determine what data of thin devices (or portions thereof) to move between different storage tiers, and the like. Additionally, also described are techniques that may be used in connection with collecting such information in a multiprocessor environment.

As described above, a thin device (also referred to as a virtual provision device) is a device that represents a certain capacity having an associated address range. Storage may be allocated for thin devices in chunks or data portions of a particular size as needed rather than allocate all storage necessary for the thin device's entire capacity. Therefore, it may be the case that at any point in time, only a small number of portions or chunks of the thin device actually are allocated and consume physical storage on the back end (on physical disks, flash or other physical storage devices). A thin device may be constructed of chunks having a size that may vary with embodiment. For example, in one embodiment, a chunk may correspond to a group of 12 tracks (e.g., 12 tracks*64 Kbytes/track=768 Kbytes/chunk). As also noted with a thin device, the different chunks may reside on different data devices in one or more storage tiers. In one embodiment, as will be described below, a storage tier may consist of one or more storage pools. Each storage pool may include multiple LVs and their associated physical devices. With thin devices, a system in accordance with techniques herein has flexibility to relocate individual chunks as desired to different devices in the same as well as different pools or storage tiers. For example, a system may relocate a chunk from a flash storage pool to a SATA storage pool. In one embodiment using techniques herein, a thin device can be bound to a particular storage pool of a storage tier at a point in time so that any chunks requiring allocation of additional storage, such as may occur when writing data to the thin device, result in allocating storage from this storage pool. Such binding may change over time for a thin device.

A thin device may contain thousands and even hundreds of thousands of such chunks. As such, tracking and managing performance data such as one or more performance statistics for each chunk, across all such chunks, for a storage group of thin devices can be cumbersome and consume an excessive amount of resources. Described in following paragraphs are techniques that may be used in connection with collecting performance data about thin devices where such information may be used to determine which chunks of thin devices are most active relative to others. Such evaluation may be performed in connection with determining where to locate and/or move data of the different chunks with respect to the different storage tiers in a multi-storage tier environment. In connection with examples in following paragraphs, details such as having a single storage pool in each storage tier, and the like, are provided for purposes of illustration. Those of ordinary skill in the art will readily appreciate the more general applicability of techniques herein in other embodiments such as, for example, having a storage group include a plurality of storage pools, and the like.

Figure 6A:
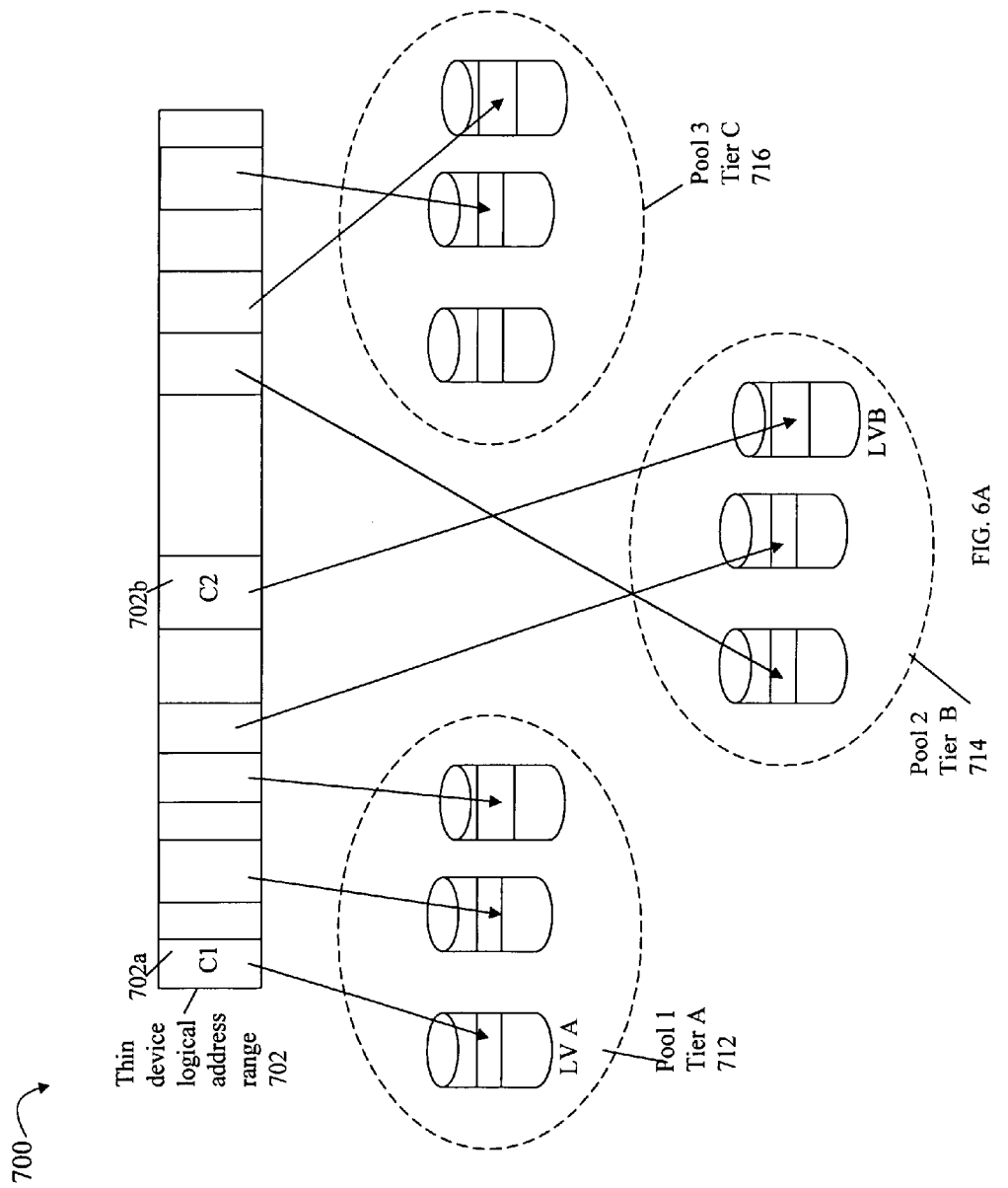
FIG. 6A is an example illustrating mapping to storage pools as may be performed for a thin device.

Referring to FIG. 6A, shown is an example 700 illustrating use of a thin device in an embodiment in accordance with techniques herein. The example 700 includes three storage pools 712, 714 and 716 with each such pool representing a storage pool of a different storage tier. For example, pool 712 may represent a storage pool of tier A of flash storage devices, pool 714 may represent a storage pool of tier B of FC storage devices, and pool 716 may represent a storage pool of tier C of SATA storage devices. Each storage pool may include a plurality of logical devices and associated physical devices (or portions thereof) to which the logical devices are mapped. Element 702 represents the thin device address space or range including chunks which are mapped to different storage pools. For example, element 702a denotes a chunk C1 which is mapped to storage pool 712 and element 702b denotes a chunk C2 which is mapped to storage pool 714. Element 702 may be a representation for a first thin device which is included in a storage group of one or more thin devices.

It should be noted that although the example 700 illustrates only a single storage pool per storage tier, an embodiment may also have multiple storage pools per tier.

Figure 6B:
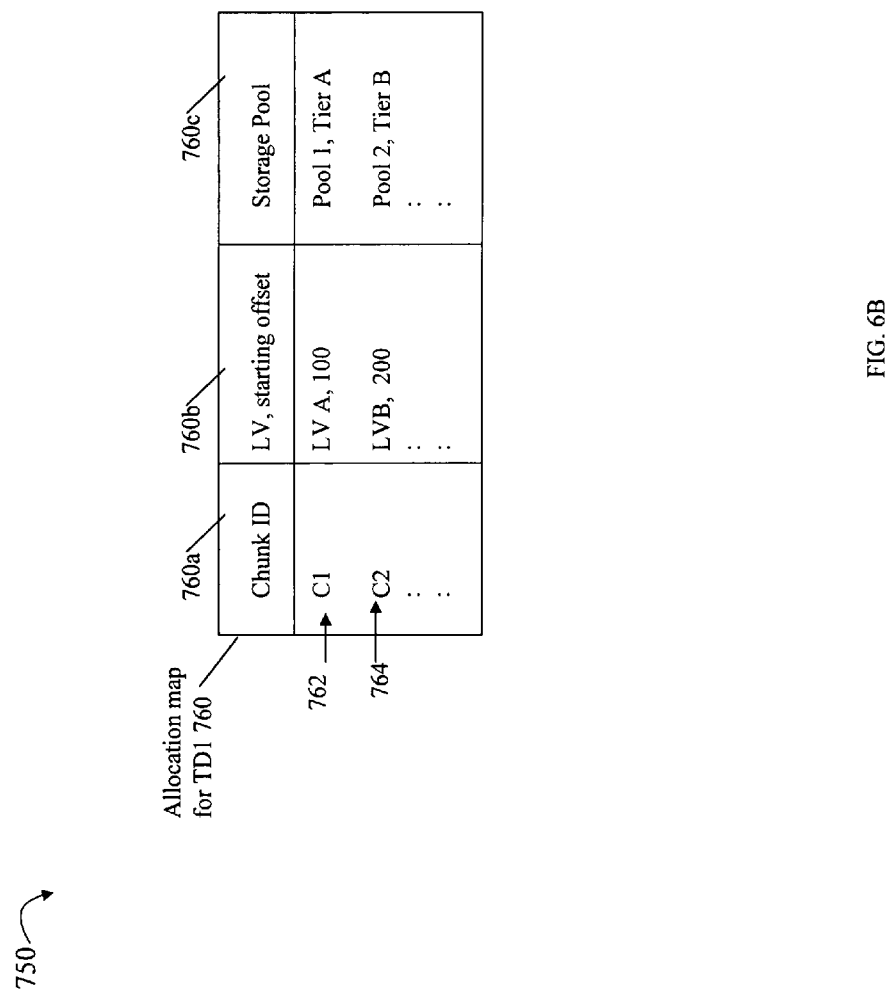
FIG. 6B is an example of representation of information that may be used in determining a physical device location mapped to a thin device.

Referring to FIG. 6B, shown is an example representation of information that may be included in an allocation map in an embodiment in accordance with techniques herein. An allocation map may be used to identify the mapping for each thin device (TD) chunk (e.g. where each chunk is physically located). Element 760 represents an allocation map that may be maintained for each TD. In this example, element 760 represents information as may be maintained for a single TD although another allocation map may be similarly used and maintained for each other TD in a storage group. Element 760 may represent mapping information as illustrated in FIG. 6A such as in connection the mapping of 702 to different storage pool devices. The allocation map 760 may contain an entry for each chunk and identify which LV and associated physical storage is mapped to the chunk. For each entry or row of the map 760 corresponding to a chunk, a first column 760a, Chunk ID, denotes an identifier to uniquely identify the chunk of the TD, a second column 760b, indicates information about the LV and offset to which the chunk is mapped, and a third column storage pool 760c denotes the storage pool and tier including the LV of 760b. For example, entry 762 represents chunk C1 illustrated in FIG. 6A as 702a and entry 764 represents chunk C2 illustrated in FIG. 6A as 702b. It should be noted that although not illustrated, the allocation map may include or otherwise use other tables and structures which identify a further mapping for each LV such as which physical device locations map to which LVs. This further mapping for each LV is described and illustrated elsewhere herein such as, for example, with reference back to FIG. 5B.

Such information as illustrated and described in connection with FIG. 6B may be maintained for each thin device in an embodiment in accordance with techniques herein.

In connection with collecting statistics characterizing performance, workload and/or activity for a thin device, one approach may be to collect the information per chunk or, more generally, for the smallest level of granularity associated with allocation and deallocation of storage for a thin device. Such statistics may include, for example, a number of reads/unit of time, # writes/unit of time, a number of prefetches/unit of time, and the like. However, collecting such information at the smallest granularity level does not scale upward as number of chunks grows large such as for a single thin device which can have up to, for example 300,000 chunks.

Therefore, an embodiment in accordance with techniques herein may collect statistics on a grouping of "N" chunks also referred to as an extent, where N represents an integer number of chunks, N>0. N may be, for example, 480 in one embodiment. Each extent may represent a consecutive range or portion of the thin device in terms of thin device locations (e.g., portion of the address space or range of the thin device). Note that the foregoing use of consecutive does not refer to physical storage locations on physical drives but rather refers to consecutive addresses with respect to a range of addresses of the thin device which are then mapped to physical device locations which may or may not be consecutive, may be on the same or different physical drives, and the like. For example, in one embodiment, an extent may be 480 chunks (N=480) having a size of 360 MBs (megabytes).

An extent may be further divided into sub extents, where each sub extent is a collection of M chunks. M may be, for example 10 in one embodiment. In one embodiment, the sub-extent size may correspond to the smallest granularity of data movement. In other words, the sub extent size represents the atomic unit or minimum amount of data that can be operated upon when performing a data movement such as between storage tiers.

Figure 7:
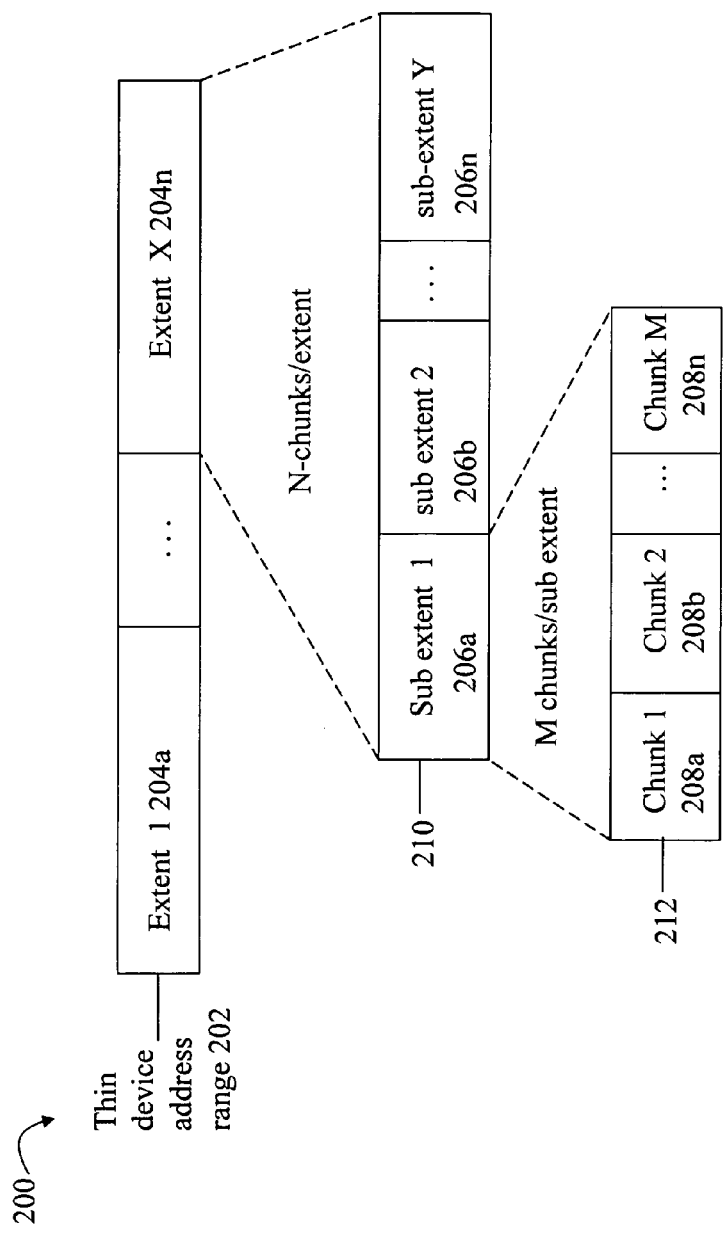
FIG. 7 is an example illustrating how a thin device may be partitioned in an embodiment in accordance with techniques herein.

Referring to FIG. 7, shown is an example illustrating partitioning of a thin device's address space or range in an embodiment in accordance with techniques herein. The example 200 includes a thin device address space or range 202 which, as described elsewhere herein, includes chunks mapped to physical storage locations. The thin device address space or range 202 may be partitioned into one or more extents 204a-204n. Each of the extents 204a-204n may be further partitioned into sub-extents. Element 210 illustrates that extent X 204n may include sub extents 206a-206n. Although only detail is illustrated for extent 204n, each of the other extents of the thin device also include a same number of sub extents as illustrated for 204n. Each of the sub extents 206a-206n may represent a grouping of "M" chunks. Element 212 illustrates that sub extent 1 206a may include chunks 208a-208n. Although only detail is illustrated for sub extent 206a, each of the other sub extents 206b-206n also include a same number of "M" chunks as illustrated for 206a. Thus, each of the extents 204a-204n may represent an grouping of "N" chunks, where $$N = \text{\# sub extents/extent} * M \text{ chunks/sub extent} \qquad \text{EQUATION 1}$$

An embodiment in accordance with techniques herein may collect statistics for each extent and also other information characterizing activity of each sub extent of a thin device. Statistics for each extent may be characterized as either long term or short term. Short term refers to statistics which may reflect performance, workload, and/or I/O activity of an extent with respect to a relatively short window of time. Thus, short term statistics may reflect recent extent activity for such a short time period. In contrast and relative to short term, long term refers to statistics reflecting performance, workload and/or I/O activity of an extent with respect to a longer period of time. Depending on the evaluation being performed, such as by the optimizer, it may be desirable to place greater weight on short term information than long term, or vice versa. Furthermore, the information maintained per sub extent may be used as needed once particular extents of interest have been identified.

Figure 8:
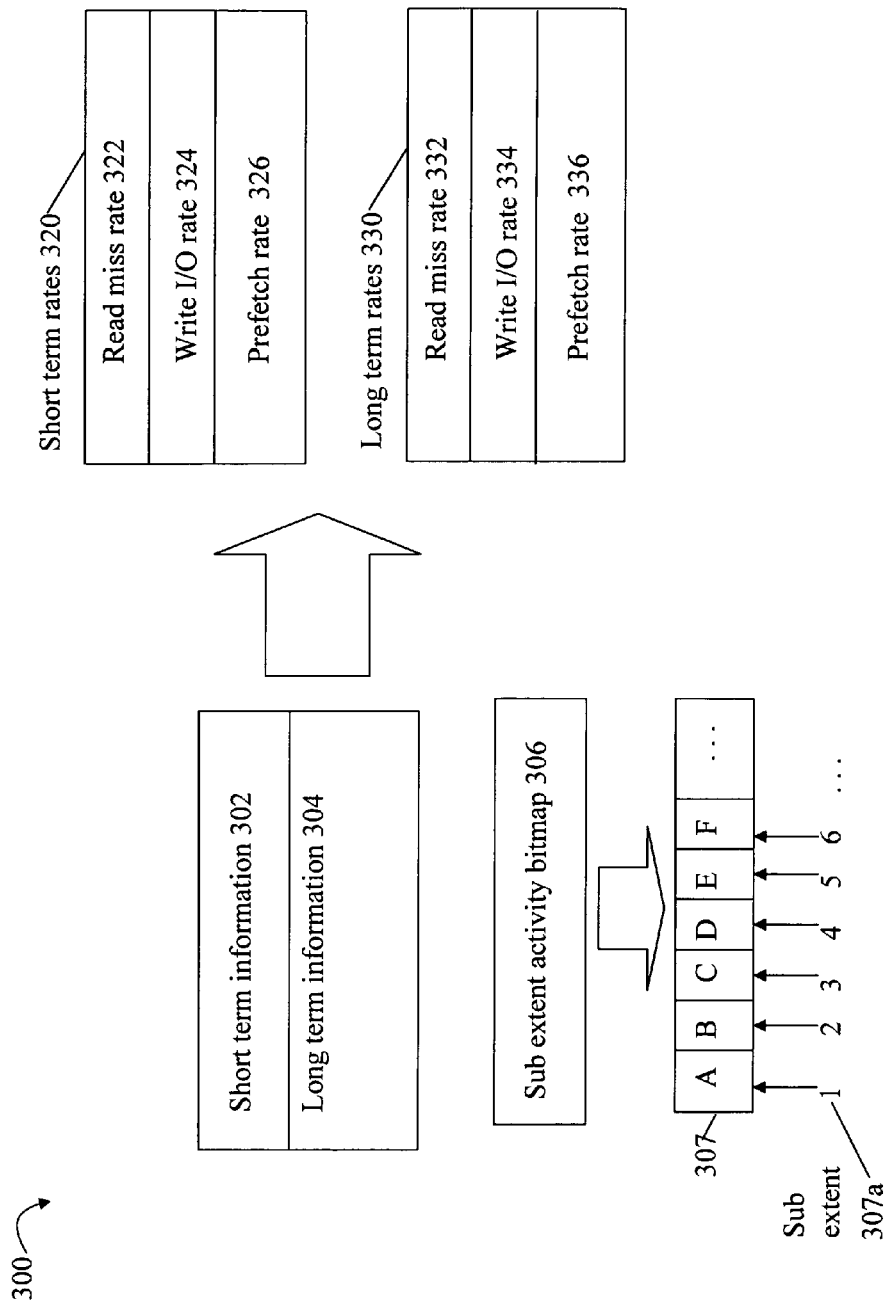
FIGS. 8 and 9 illustrated activity information that may be determined for thin devices in an embodiment in accordance with techniques herein.

Referring to FIG. 8, shown is an example of information that may be collected and used in connection each extent in an embodiment in accordance with techniques herein. The example 300 illustrates that short term information 302, long term information 304 and a sub extent activity bitmap 306 may be collected for each extent. The short term information 302 and long term information 304 may be used in connection with determining short term rates 320 and long term rates 330 for each extent. The statistics included in 302, 304, 320 and 330 may reflect activity with respect to the entire extent. The activity bitmap 306 is illustrated in further detail by element 307 as including an entry for each sub extent in the associated extent. Entries of 307 are denoted by A, B, C, and the like. Each of the entries of 307 represents aggregated or collective activity information for a corresponding sub extent denoted by the numeric identifiers 307a of 1, 2, 3, etc. Each entry of 307 may include one or more bits used to encode an activity level with respect to all chunks of a corresponding sub-extent. For example, the entry of 307 denoted as A represents an activity level for all chunks in sub extent 1. An embodiment may use any number of bits for each entry of the activity bitmap 306, 307. For example, in one embodiment, each entry of the activity bitmap may be 2 bits capable of representing any of 4 integer values –0, 1, 2, and 3.

As will be described in following paragraphs, the short term rates 320, long term rates 330 and sub extent activity bitmap 306 may be used in connection with a variety of different evaluations such as by the optimizer. Generally, the activity level information or data for an extent such as illustrated in FIG. 8 may be referred to as extent activity level information including one or more metrics indicating an activity level for the extent. The extent activity level information may comprise short term activity information (e.g., such as 302 and/or 320) and long term activity information (e.g., such as 304 and 330).

In one embodiment, the short term rates 320 for an extent may include a read miss rate 322, a write I/O rate 324 and a prefetch rate 326 for the extent. The long term rates 330 for an extent may include a read miss rate 332 (e.g., number of read misses/unit of time, where a read miss refers to a cache miss for a read), a write I/O rate 334 (e.g., number of writes/unit of time) and a prefetch rate 336 (e.g., number of prefetches/unit of time) for the extent. As known in the art, data may be prefetched from a physical device and placed in cache prior to reference or use with an I/O operation. For example, an embodiment may perform sequential stream I/O recognition processing to determine when consecutive portions of a thin device are being referenced. In this case, data of the sequential stream may be prefetched from the physical device and placed in cache prior to usage in connection with a subsequent I/O operation. In connection with a portion of data at a first point in a sequential stream associated with a current I/O operation, data subsequent to the first point may be prefetched such as when obtaining the portion from a physical device in anticipation of future usage with subsequent I/Os. Each of the foregoing rates of 320 and 330 may be with respect to any unit of time, such as per second, per hour, and the like. In connection with describing elements 302 and 304 in more detail, what will be described is how an embodiment in accordance with techniques herein may determine the short term rates 320 and long term rates 330 using a decay function and decay coefficients.

In an embodiment in accordance with techniques herein, a decay coefficient may be characterized as a weighting factor given to previous activity information. The higher the coefficient, the greater the weight given to previous activity information for the extent. Thus, the adjusted activity level of an extent at a current time, "An", may be generally represented as a function of a current observed or actual activity level for the current time, "$a_n$", a decay coefficient, "r", and previous adjusted activity level for the previous time period or sampling period, "$A_{n-1}$". In connection with the foregoing, "A" may represent an adjusted activity level, "n" may denote the current time period or sampling period and "n-1" may denote the immediately prior or previous time period or sampling period at which the activity for the extent was determined. In other words, "$a_n$" is adjusted to take into account previous activity as represented by "$A_{n-1}$" and "An" represents the resulting adjusted value of "$a_n$". With respect to a statistic or metric such as a number or read misses, "$a_n$" and "An" may each represent an integer quantity or number of read misses within a current sampling period, "n". The foregoing may generally be represented as:

$$An = a_n + (r * A_{n-1})$$ EQUATION 2 wherein $a_n$ is the actual observed activity metric for the current or "nth" sampling period, "r" is a decay coefficient, "$A_n$" is the adjusted activity metric for the current or "nth" sampling period, and "$A_{n-1}$" is the adjusted activity metric from the previous or "n-1" sampling period.

Beginning with an initial time period or sampling period, denoted by i="0" (zero), the adjusted activity A0 may be initially that which is observed, a0. Subsequent observed or actual activity levels may be adjusted as described above. Generally, "$a_i$" may denote an actual or observed value obtained for an activity metric for a sampling period "i", where "i" is an integer greater than or equal to 0. "Ai" may similarly denote an adjusted activity metric (or adjusted value for "$a_i$") for a sampling period "i", where "i" is an integer greater than or equal to 0. Thus, for consecutive sample periods at which actual or observed activity metrics are obtained (as denoted by lower case "$a_i$"s), corresponding adjusted activity levels (e.g., "A" values) may be determined as follows:

```
A0 = a0            /* Adjusted activity level A0, at time = 0 or initially */
A1 = a1 + (r * A0) /* Adjusted activity level A1, at first samping period,
                      i = 1 */
A2 = a2 + (r * A1) /* Adjusted activity level A2, at second sampling
                      period, i = 2 */
.
.
.
``` and so on for subsequent sampling periods 3, 4, and the like, based on EQUATION 2.

In connection with EQUATION 2, 0<=r<1, where "r" is a decay coefficient or weight given to previous activity. Varying "r" in EQUATION 2 results in accordingly varying the weight given to past or previous activity. If r=0, then no weight is given to previous or historic values. Thus, the closer "r" is to 0, the lesser weight given to previous activity. Similarly, the closer "r" is to 1, the greater the weight given to previous activity. In connection with determining an adjusted activity level, An, using EQUATION 2 for short term and long term, different decay coefficients may be selected. Generally "r" for short term is less than "r" used in connection with long term activity. For example, in one embodiment, "r" used in connection short term activity levels may be 50% or 0.50 or smaller. "r" used in connection with long term activity levels may be 80% or 0.80 or larger. The foregoing are exemplary values that may be selected for "r" in connection with short term and long term activity levels depending on the weight to be given to previous activity. In connection with short term activity, a decay coefficient may be selected in accordance with providing a relatively short term rate of decay for an activity level metric determined at a point in time. For example, a short term rate of decay may provide for a rate of decay for an activity level metric on the order of one or more hours (e.g., less than a day). In connection with long term activity, a decay coefficient may be selected in accordance with providing a relatively long term rate of decay for an activity level metric determined at a point in time. For example, a long term rate of decay may provide for a rate of decay for an activity level metric on the order of one or more days, a week, and the like. Thus, an activity metric at a first point in time may have a weighted or residual affect on an adjusted activity level determined at a later point in time in accordance with the selected decay coefficient indicating the rate of decay of the activity metric.

As mentioned above, EQUATION 2 results in a metric or count, such as a number of read misses, number of writes, or number or prefetches during a sample period. It may be desirable to also determine a rate with respect to a unit of time, such as per second, per hour, and the like, for each of the foregoing adjusted activity metrics An. A rate with respect to a unit of time for the adjusted activity level An may be represented as:

$$Ar = An*(1-r)/(1-r^{n-1}) \quad \text{EQUATION 3}$$

where
  Ar=the adjusted activity rate per unit of time,
  r=decay coefficient or weight as described above,
  n=denotes an "nth" sampling period as described above,
  An=adjusted activity level determined for a given sampling period "n" (e.g. using EQUATION 2 as described above).

Generally, the higher the decay coefficient, r, the slower the change in Ar as may be the desired case with long term Ar values. Thus an embodiment may select decay coefficients for use with long term and short term Ar values so that, when plotted with respect to time, long term Ar values generally have a smaller slope than that associated with short term Ar values.

Figure 9:
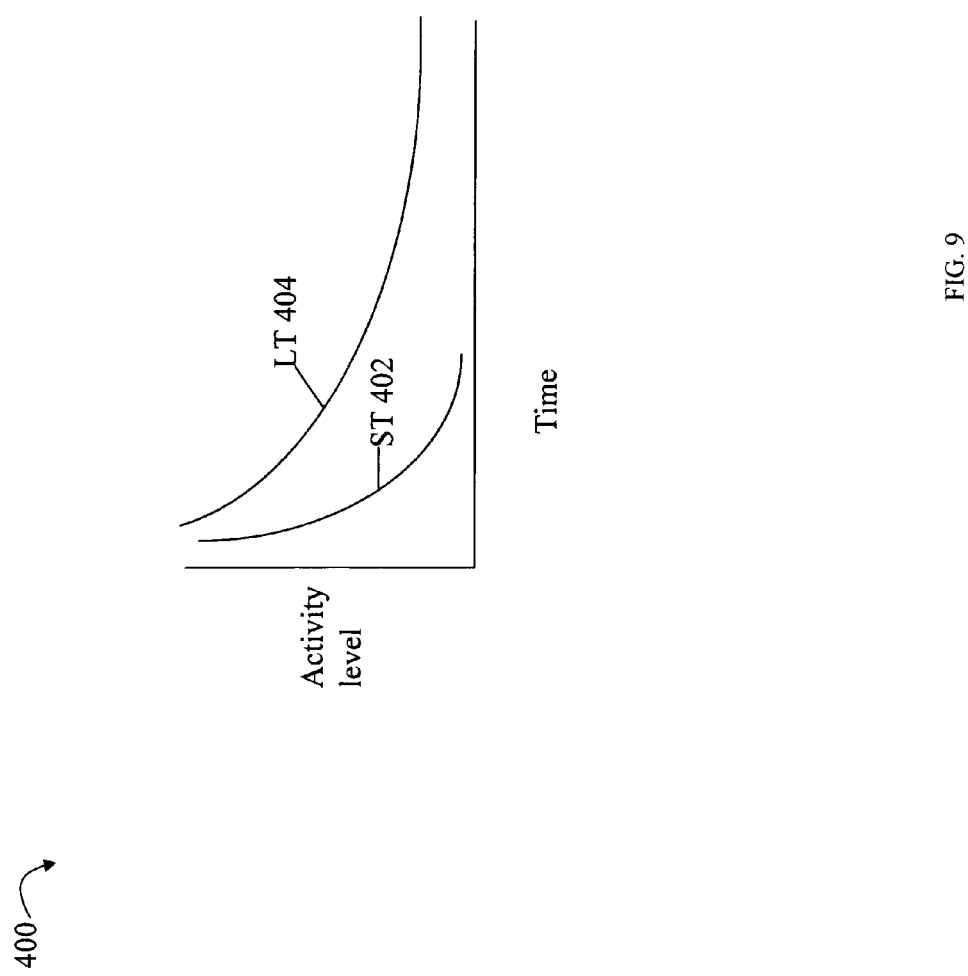

Referring to FIG. 9, shown is an example graphically illustrating the general shape of curves for long term (LT) and short term (ST) values in an embodiment in accordance with techniques herein. The activity level values (Y-axis values) are plotted with respect to time (X-axis). The activity level values may be determined using EQUATIONS 2 and/or 3. Curve 402 may be produced using one of EQUATIONS 2 and 3 where a first value for the decay coefficient "r" is selected for ST usage. Curve 404 may be produced using one of EQUATIONS 2 and 3 where a second value for the decay coefficient "r" is selected for LT usage. The values selected for "r" in connection with 402 and 404 may be relative so that the first value for "r" used with 402 is less than the second value for "r" used with 404.

In one embodiment, each of the different An values determined using EQUATION 2 may be converted to a corresponding Ar value using EQUATION 3 when desired.

In connection with the foregoing, for example, with respect to a number of read misses, "$a_n$" represents the number of such operations that have occurred in a current sample period, n. For example, if a sample period=10 minutes so that statistics for an extent are collected and/or computed every 10 minutes, "$a_n$" represents the number of read misses that occurred in the last 10 minute sample period or time interval. $A_{n-1}$ represents the previous or last A calculation (e.g., as determined using EQUATION 2) from the previous sample period, denoted "n−1".

With reference back to FIG. 8, an embodiment may collect short term information 302 as counter values indicating a count or number of each type of operation for a current time period or sampling period "n". The following may represent different "$a_n$" values as included in the short term information 302 for an extent: read miss count (number of read misses for the extent during the sampling period), prefetch count (number of prefetches for the extent during the sampling period) and write count (number of writes for the extent during the sampling period).

The short term information 302 may also include storing previous A values as determined for the sampling period "n−1" using EQUATION 2 above. For example, short term information 302 may also include storing three (3) previous adjusted activity level values or A values for sampling period "n−1" using EQUATION 2 above for the read miss count, prefetch count and write count.

The short term information 302 may also include a timestamp value indicating the timestamp associated with the previous sampling period "n−1".

Using the above-mentioned short term information 302, an embodiment may calculate updated short term rates 320 using EQUATION 3 for a sampling period "n" for a selected "r" as a short term decay coefficient. With each new sampling period, the short term information may be accordingly updated so that which is associated with sampling period "n" subsequently becomes associated with sampling period "n−1".

The long term information 304 may include long term rates or Ar values as determined using EQUATION 3 for a read miss rate (e.g., number of read misses/second), a prefetch rate (e.g., number of prefetches/second) and a write rate (e.g., number of writes/second). The long term information 304 may also include a time duration interval used for determining an adjusted Ar value for the current time or sampling period "n". For example, the time duration interval may represent the amount of time for which statistics are collected and used in connection with long term Ar values. An embodiment may store a set of long term Ar values rather than calculate such Ar values on demand from other stored information as in the case above for short term rates 320 (e.g., where short term information 302 is stored and used to calculate short term rates 320 on demand). Thus, in such an embodiment, the long term rates 330 may be included the long term information 304 where such long term rates 330 may be updated with each sampling period. In one embodiment with the arrival of a new sampling period "n", the long term information 304 may include Ar values for the foregoing statistics as determined using EQUATION 3 for a sampling period "n−1". These long term Ar values for "n−1" may each be multiplied by the time duration interval to determine $A_{n-1}$, an adjusted metric for the long term time period. The foregoing $A_{n-1}$ value may then be used with EQUATION 2 to determine An for the current sampling period "n" using a selected "r" as a long term decay coefficient. Using An, EQUATION 3 may then be used to obtain updated long term rates Ar values. With each new sampling period, the long term information may be accordingly updated so that which is associated with sampling period "n" subsequently becomes associated with sampling period "n−1".

With reference back to FIG. 8, described above is an activity bitmap 306 having an entry per sub extent where each such entry may indicate an aggregate or collective activity level with respect to all chunks of the associated sub-extent. The number of different activity level states that may be represented for each sub extent depends on the number of bits per entry of the activity bitmap. In one embodiment, each entry of the activity bitmap may be 2 bits as described above so that each entry may be an integer in the inclusive range of 0.3. Processing may be performed to decrement each entry having a non-zero value by 1 every predetermined time period, such as every 12 hours. Each time there is any I/O operation to a sub extent since the sub extent was located or moved to its current physical location, the sub extent's entry in the activity bitmap 306 may be set to 3. Thus, each entry in the bitmap may represent activity level information for up to 3 of the predetermined 12 hour time periods. An embodiment may also have a different number of bits per entry to represent a larger number of predetermined time periods. Based on the foregoing, the lower the value of a bitmap entry for a sub extent, the longer the amount of time that has lapsed since the sub extent has had any I/O activity.

Figure 10:
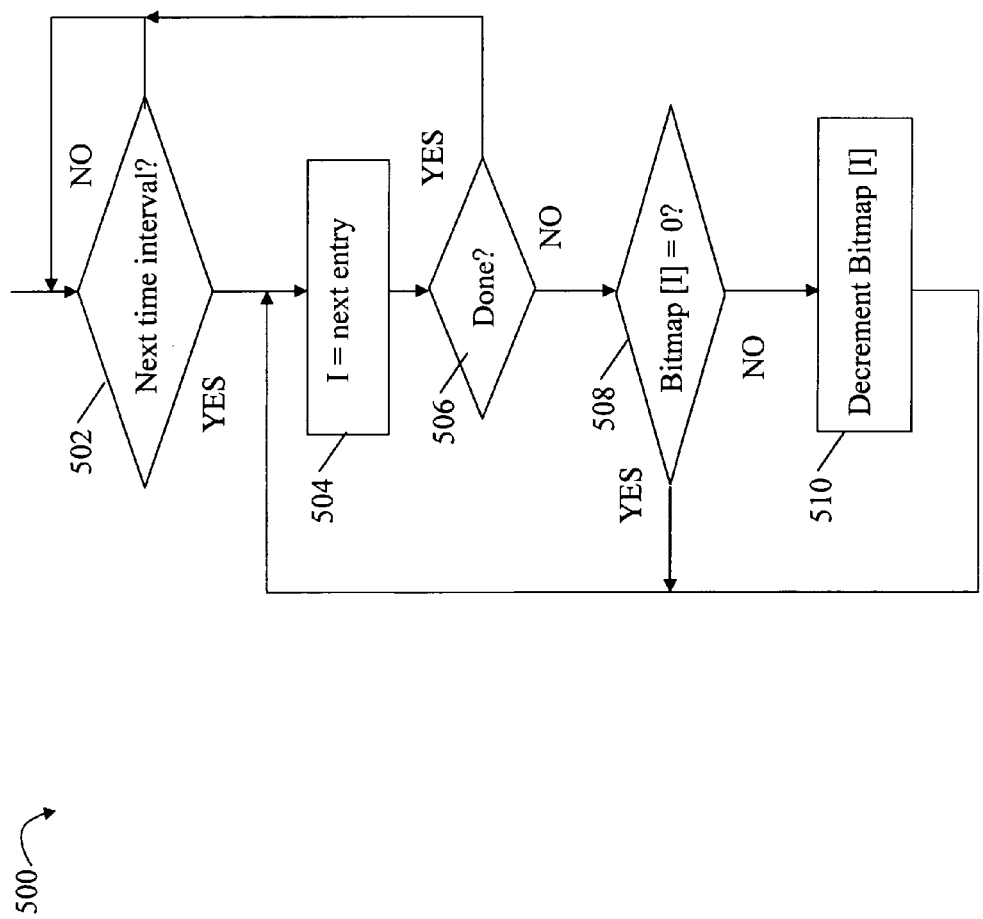
FIGS. 10, 14, 15, 16 and 17 are flowcharts of processing steps that may be performed in an embodiment in accordance with techniques herein.

Referring to FIG. 10, shown is a flowchart of processing steps that may be performed in connection with each activity bitmap associated with an extent in an embodiment in accordance with techniques herein. The flowchart 500 summarizes processing described above where each bitmap for each extent may be traversed with the occurrence of a predetermined time interval, such as every 12 hours. At step 502, a determination is made as to whether the next time interval has lapsed. If not, processing waits at step 502 until step 502 evaluates to yes and control proceeds to step 504. At step 504, I is initialized to the next entry in the bitmap. I represents a loop counter when traversing through the bitmap and denotes the bitmap entry currently selected for processing. At step 506, a determination is made as to whether the entire bitmap has been processed. If step 506 evaluates to yes, control proceeds to step 502 until an amount of time again lapses equal to that of the time interval. If step 506 evaluates to no, control proceeds to step 508 where a determination is made as to whether the current bitmap entry (e.g. bitmap [I]) is zero. If so, control proceeds to step 504. Otherwise, control proceeds to step 510 where the current bit map entry is decremented by one (1) and control proceeds to step 504 to process the next entry in the bitmap.

The activity bitmap may be used in connection with determining an activity level associated with each sub extent, the smallest amount of data that can be associated with a data movement operation to relocate data from one physical device to another. It should be noted that an embodiment may have functionality and capability to physically move data in units or amounts less than a sub extent. However, when performing processing to determine data movement candidates, such as by the optimizer, such processing may consider candidates for data movement which have a minimum size of a sub extent. That is, all data of the sub extent may be either moved or relocated as a complete unit, or remains in its current location. In connection with a sub extent when performing a data movement, it may be that not all chunks of the sub extent are actually moved. For example, suppose a sub extent is 10 chunks and the sub extent is to be moved from a first storage tier, such as from SATA or FC, to a second storage tier, such as flash. It may be that 9/10 chunks of the sub extent are unallocated or already in flash storage with only 1 chunk stored in the first storage tier. In this case, processing only needs to actually move the single chunk from the first storage tier to flash since the remaining 9 chunks are either already in the flash tier or unallocated. With a sub extent, the amount of data actually moved may be at most the size of the sub extent but may be less depending on, for example, whether all chunks of the thin device sub extent are allocated (e.g., actually map to physical storage), depending on the current physical device upon which chunks of the sub extent are located prior to movement, and the like. It should be noted that chunks of a sub extent may be located in different storage tiers, for example, depending on where the chunk's data is stored such as at the time when written as well as the result of other conditions that may vary with embodiment.

As an example use of the activity bitmap is in connection with promotion and demotion. Generally, promotion may refer to movement of data from a first storage tier to a second storage tier where the second storage tier is characterized as having devices of higher performance than devices of the first storage tier. The performance of a tier may be expressed in terms of one or more attributes of devices in the tier as described above such as, for example, related to latency time, I/O throughput, and the like. As such, movement of data, such as associated with a sub extent, from a first tier of FC devices to a second tier of flash devices may be characterized as promoting the sub extent. Demotion may refer generally to movement of data, such as for a sub extent, from a first storage tier to a second storage tier where the first storage tier is characterized as having devices of higher performance than devices of the second storage tier. As such, movement of data from a first tier of flash devices to a second tier of FC devices and/or SATA devices may be characterized as a demotion. As an example use of the activity bitmap, the bitmap may be used determine selective sub extents which exhibit the highest activity level such as those having counters=3 (e.g., "hot" or active areas of the extent). These sub extents may be candidates for promotion or data movement to a higher performing storage tier and may be given preference for such promotion and data movement over other sub extents having activity bitmap entries which are less than 3. In a similar manner, the activity bitmap may be used to identify the "coldest" or inactive sub extents. For example, sub extents having bit map entries=0 may be candidates for demotion to a lower performing storage tier.

In connection with promotion data movements, an embodiment may want to be responsive to a change in workload with respect to the short term. With demotion, an embodiment may not want to move data as quickly as with promotion may also want to consider longer term workloads prior to moving such data to a lesser performing storage tier. With promotion, an embodiment may give greater weight to ST workload and activity data. With demotion, an embodiment may additionally consider LT workload and activity rather than just such ST information.

The information as described and illustrated in FIG. 8 and above may be used for a variety of different purposes and evaluations. For example, an embodiment may use one or more of the short term rates to identify one or more active extents based on such aggregated extent-level activity data. Subsequently, once an active extent is identified such as a candidate for promotion, the extent's activity bitmap may be examined to determine which sub extents are most active. Processing may be performed to selectively move some of the sub extents of the active extent (e.g., those with counters=3) to a higher performing storage tier.

As another example, the activity bitmaps of extents may be used to determine a promotion ranking used to identify which extent may be promoted prior to one or more other extents. To further illustrate, an embodiment may have two extents, both which are candidates for promotion. The two extents may exhibit similar activity levels based on aggregate extent-level information such as based on short term rates 320 for each extent. The extent having the lesser number of active sub extents may have a higher priority for movement than the other extent. For example, processing may be performed to count the number of non-zero bit map entries for each of the two extents. The extent having the lower count may have a higher priority than the other extent having a higher count. In other words, the extents may be ranked or ordered for promotion based on a number or count of non-zero bit map entries. The extent having the lower count may be characterized as also exhibiting the greatest activity level density based on the foregoing counts of the activity bitmaps.

As another example in connection with demotion, an embodiment may use one or more of the short term rates 320 in combination with one or more of the long term rates 330 to identify one or more inactive extents based on such aggregated extent-level activity data. Subsequently, once an inactive extent is identified, the extent's activity bitmap may be examined to determine which sub extents are inactive and should be demoted rather than automatically demoting all sub extents of the inactive extent. Processing may be performed to selectively move some of the sub extents (e.g., those with counters=0, counters less than some threshold such as 1, and the like) to a lower performing storage tier.

The foregoing are just some exemplary uses of the activity level information described above that may be used in connection with thin devices in order to evaluate portions of the thin device for movement between storage tiers. More generally, the techniques described herein may also be used in an embodiment in connection with other types of devices and logical entities mapping to storage in one or more storage tiers to determine what portions of data are candidates for movement between storage tiers. As another example, the techniques herein may also be used to determine whether to move data to a spin down disk of a MAID (Massive array of idle disks) system. For example, by examining long term rates 330 and short term rates 320, it may be determined that certain data is accessed infrequently and may be a candidate for data movement to a MAID system.

It should be noted that movement of data between tiers from a source tier to a target tier may include determining free or unused storage device locations within the target tier. In the event there is an insufficient amount of free of unused storage in the target tier, processing may also include displacing or relocating other data currently stored on a physical device of the target tier. An embodiment may perform movement of data to and/or from physical storage devices using any suitable technique. Also, any suitable technique may be used to determine a target storage device in the target tier where the data currently stored on the target is relocated or migrated to another physical device in the same or a different tier.

One embodiment in accordance with techniques herein may include multiple storage tiers including a first tier of flash devices and one or more other tiers of non-flash devices having lower performance characteristics than flash devices. The one or more other tiers may include, for example, one or more types of disk devices. The tiers may also include other types of SSDs besides flash devices.

The different levels of activity information described herein as obtained at a device level, extent level, and sub extent level provide a hierarchical view for characterizing activity of different portions of thin devices. An embodiment may also calculate activity information for other types of devices, such as physical devices and LVs, using EQUATIONS 2 and 3 and also use such information, for example, in determining data movement candidates. Activity information at higher device levels may be used to first identify devices which may be candidates for data movement, such as between storage tiers (e.g. for promotion and/or demotion). In connection with thin devices, once such a first device is identified, additional detail regarding the first device's activity as reflected in extent activity level information may be used to identify an extent of the first device as a candidate for data movement. Subsequently, the activity bitmap for the extent identified may then be used to determine one or more sub extents of the identified extent for data movement. The techniques herein may be used for collecting and tracking activity of devices, both logical (e.g., thin devices, LVs, and the like), and physical devices, at a variety of different levels. Use of the decay coefficients and equations for determining adjusted activity levels to account for previous activity levels provides an effective way of tracking workload and activity over time without having to keep a large database of historical statistics and metrics for long and short time periods.

In addition to the activity information described above for each extent and sub extent of a thin device, an embodiment may also track device level activity information for logical devices (e.g., thin devices, LVs, and the like) and physical devices in a data storage system as also noted. Additionally, an embodiment may track activity information for thin device pools. What will now be described are examples of what information may be tracked at the device and pool levels and also how an embodiment in accordance with techniques herein may perform processing to collect the data needed to determine the activity information described herein.

When a DA or other device interface services an I/O, the DA may not typically have any knowledge regarding thin devices and possibly other logical constructs such as metavolumes or metadevices as may be known from the host's point of view. Rather, the DA may have knowledge about data devices such as LVs, physical devices, and storage pools. In connection with collecting data for use with techniques herein, each DA may be provided with additional mapping information regarding thin devices and where storage for the thin devices is allocated (e.g., such as described by the allocation map). The DA may use this information to determine what thin device (if any) is associated with a given back end I/O request. When the DA is servicing a back end I/O request, the DA may record information about the I/O including information about the thin device associated with the I/O request. Such additional information about the thin device is needed in order to perform statistics collection of activity data for the thin devices in accordance with techniques herein.

For example, assume there are physical devices D0, D1 and D2 and the DA is performing a read to D0, a write to D1 and a prefetch for D2, the DA may first perform a translation or mapping to identify the thin device, if any, associated with each I/O operation and then store data in a record for each such I/O information. It should be noted that the set of records produced for each of the recorded I/O operations may also be referred to as an I/O trace. Each I/O associated with a thin device may result in the following information being recorded in a data record of the DA:

Thin device, pool, operation, extent, sub extent
where
thin device, pool, extent and sub extent identify, respectively, the thin device, pool, extent and sub extent associated with the I/O operation, and
operation identified the type of I/O operation such as related to the different activity data being collected (e.g., read, write, prefetch).

The DA may also qualify or filter out certain back end activity to exclude these I/Os from the I/O trace. For example, the DA may filter out I/O operations related to local clone copying, or other data storage system internal copying to filter out activity not directly the result of a host I/O received by the data storage system. It should be noted that any I/O that cannot be mapped or translated to a thin device may be excluded from the I/O trace and counts for thin devices. Each DA may store its I/O trace information locally, such as in memory local to the DA.

Figure 11:
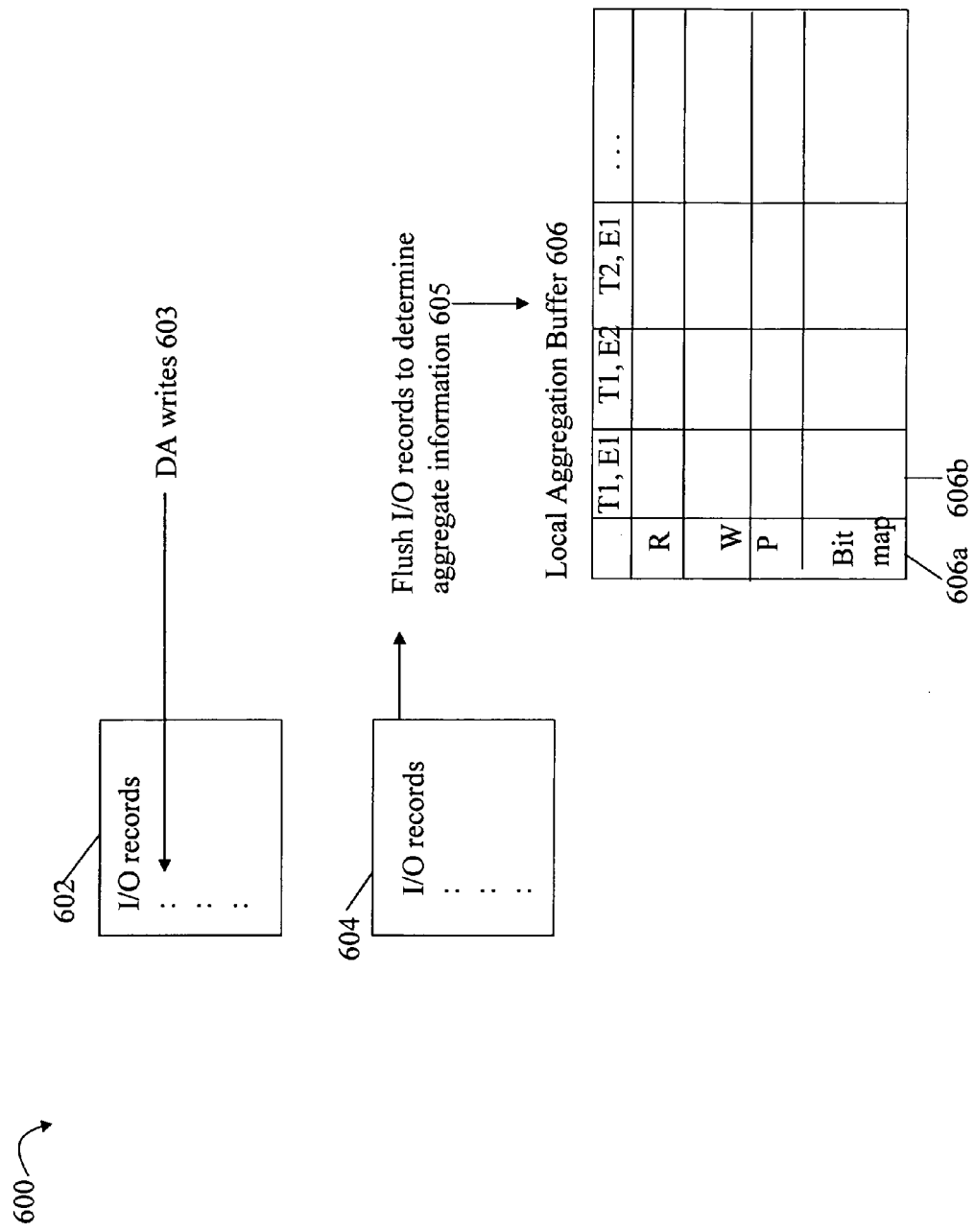
FIG. 11 illustrates data that may be collected by a DA for thin devices in an embodiment in accordance with techniques herein.

In one embodiment, each DA may use a double buffering technique to collect and also process I/O trace information it has collected. FIG. 11 is an example illustrating processing that may be performed by a DA in connection with collecting I/O trace information for thin devices. Elements 602 and 604 may represent two buffers. At a point in time, the DA may be writing I/O records of I/O trace information 603 to buffer 602 and buffer 604 may be full of previously written I/O records. Once buffer 604 is full, it may be flushed by the DA for processing in a step 605 to determine aggregate I/O trace information for thin devices. Such aggregate I/O trace information for the DA may be written to a local aggregation buffer 606 as the buffer 604 is flushed. When the buffer 604 has been flushed and the DA has filled up buffer 602, buffer 602 may then be flushed as described above to determine aggregate I/O trace information and the DA may write to buffer 604. This alternating use of the two buffers 602, 604 continues repeatedly over time. As part of step 605 for flushing one of the buffers, the I/O trace information is processed by the DA to determine accumulated counts for the different metrics of interest (e.g., read miss counts, write counts, prefetch counts) for each extent as identified by thin device identifier and extent identifier. The local aggregation buffer 606 may be a local buffer of the DA where such aggregated information is stored as determined when flushing I/O trace records. The local aggregation buffer 606 is represented as including a column of information for each thin device extent. For example, column 606b includes aggregated information for extent E1 of thin device T1. Column 606a indicates the aggregated bitmap information and different counts collected for each type of I/O operation of interest for each extent. As denoted by column 606a, the aggregated information includes a read miss count (denoted by R), a write count (denoted by W), a prefetch count (denoted by P), and an activity bitmap (denoted by bitmap). Thus, each cell or entry in the table represents an aggregated item of information for one of the extents in accordance with the I/O records flushed from the buffer 604.

The information included in 606 may represent aggregated thin device activity information for a single DA with respect to the I/O trace information processed during flushing. The aggregated information in 606 may represent a single DA's contribution to each of the statistics or "$a_n$" values for the I/O trace information processed.

Figure 12:
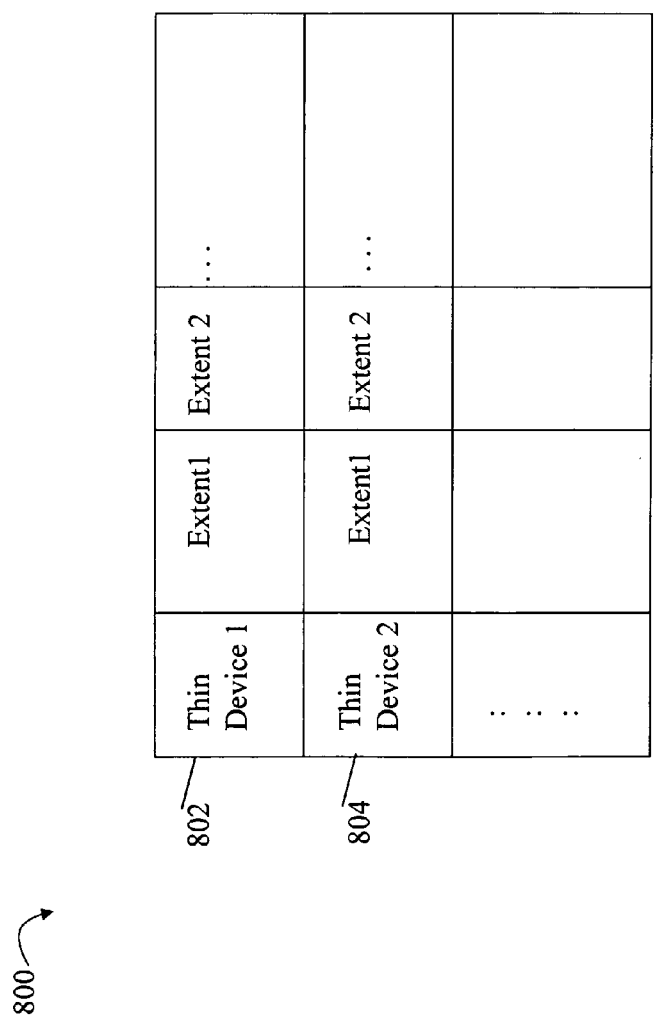
FIG. 12 is an example of a master copy of activity information for thin devices that may be used in an embodiment in accordance with techniques herein.

At various points in time such as part of background processing, the DA may use the information of the local aggregation buffer 606 to update a master copy of information maintained for thin devices in global memory (GM). FIG. 12 is an example illustrating the master copy of information 800 as may be stored in GM in an embodiment in accordance with techniques herein. The example 800 includes a row of information for each thin device, where each such row may include aggregate extent level activity information for each thin device's extent. Although not specifically illustrated in FIG. 12, for each extent of a thin device, the master copy may include activity information as described in connection with element 606 of FIG. 11. However, the master copy may represent a further aggregation of such activity information across all DAs in the data storage system.

Since an embodiment in accordance with techniques herein may include multiple DAs, more than one DA (as well as possibly other components) may be attempting to access the master copy in GM for updating at any point in time. An embodiment may use any suitable synchronization techniques to synchronize access to the master copy. For example, one embodiment may use a locking technique where a lock is associated with each portion of the master copy for each thin device. In order to update the thin device information of the master copy, a DA acquires the appropriate lock for the thin device, updates the master copy, and then releases the lock thereby allowing another DA or other component to now acquire the lock.

Each DA may perform processing as described above in connection with I/Os serviced by the DA. The foregoing processing by each DA to flush I/O trace records, determine local aggregation buffer information, and update the master copy in GM may be performed independently of when sampling occurs such as at a sampling period which may be performed in a distributed fashion as described in more detail in following paragraphs which further process the information in the master copy. It should also be noted that each DA may also perform processing to record and aggregate activity information for physical devices and LVs serviced by the DA where the DA may also collect and update a master copy of such information also maintained in GM for physical devices and LVs.

With the occurrence of each sampling period, processing may be performed to periodically use the copy of master information to determine updated short term and long term activity information for each extent. Additionally, at the occurrence of each such sampling period, an embodiment may also perform processing to determine aggregate device level activity information for one or more logical device constructs (e.g., thin devices, LVs) and physical devices. The thin device level activity information determined for each thin device may include the following metrics for short term: read miss count, write count, prefetch count, and total amount of data read (e.g., amount in KB), total amount of data written (e.g., amount in KB), and timestamp of sample, and the following metrics for long term: read miss rate, write rate, prefetch rate, and total amount of data read/unit of time (e.g., read data rate in KB/sec), total amount of data written/unit of time (e.g., write data rate in KB/sec), and long term duration. The metrics maintained for each thin device (e.g., represented aggregated or collective information for each thin device at the thin device level) are similar to those described above with respect to short term and long term. It should be noted that in this example, the thin device level activity information may also determine the short term metrics of total amount of data read (e.g., amount in KB), and total amount of data written (e.g., amount in KB) and long term metrics of read data rate and write data rate which may not be maintained for each extent. Each of these thin device level metrics may be obtained as described above in connection with other long term and short term metrics using EQUATIONS 2 and 3. Additionally, an embodiment may calculate and maintain activity level information for each physical device which is similar to the thin device level activity information just described and may also include other physical device level activity information, such as information regarding queue depth or length of the wait queue for processing a backend I/O by a DA. An embodiment may also calculate and maintain other device level activity information for each LV and also for each storage pool with the occurrence of each such sampling period. The device level activity information maintained for an LV may include any one or more suitable performance or activity related metrics (e.g., writes/second, reads/second, and the like). In one embodiment, LV device level activity information may be similar to the thin device level activity information described above and as determined using EQUATIONS 2 and 3 described above. Activity information may also be determined for thin device pools (e.g., pool level activity information) and also for each thin device per pool in order to track what portion of a thin device's activity is associated with each pool (e.g., what is the activity level of each pool on behalf of each thin device). Activity information for thin device pools may include those metrics as determined for each thin device but on a per thin device pool level (e.g., for each of short term and long term, read miss rate, write rate, prefetch rate, KB/sec for reads, KB/sec for writes, such rates being determined using the EQUATIONS 2 and 3 described herein). An embodiment may collect data used to determine activity level information for LVs, physical devices, and the like, using any suitable technique for use in combination with those as described herein with thin devices. For example, in one embodiment, activity level information for LVs and physical devices may be obtained in a manner similar to that as described herein for thin devices with the omission of any extent and sub extent information. Thin pool level activity information may be determined from the thin device I/O trace information recorded and collected for each thin device back end I/O.

To scale the computation bandwidth of the processing performed at each sampling period, each individual DA may perform processing for a subset of the logical devices (e.g., thin devices and LVs) and physical devices. For each sampling period, the DA determines a first total of the number of logical devices in the system (e.g., such as a single data storage array corresponding to the system in which the DA operates) and a second total of the number of physical devices in the system and divides each such the total by the number of active DAs. The result of the foregoing represents the count or number of devices that an individual DA is responsible for. In the event of a DA becoming inactive (e.g., inoperative, going offline, or otherwise not participating in the sample period processing for activity information collection and calculations), it is possible that a subset of devices will miss a sample. The next time a sampling period occurs, the device list is again divided by the number of active DA's with the omission of the inoperative DA.

Each DA may also determine for which particular devices it calculates activity level information at each sampling period. In one embodiment, each DA may determine such information for devices (both logical and physical devices as noted above) based on a numeric identifier associated with each DA. In one embodiment, all DAs may be assigned an integer from a sequential range of integers, such as beginning with 1. For example, if there are 8 DAs, each DA may be assigned an different integer from the inclusive range 1 . . . 8. The physical devices for which activity level information is obtained in accordance with techniques herein at a sampling period may be assigned an integer identifier from a sequential range beginning with 1. Similarly, the logical devices for which activity level information is obtained in accordance with techniques herein at a sampling period may be assigned an integer identifier from a sequential range beginning with 1. Each DA assigned integer "i" may then perform processing at each sampling period for each logical device and each physical device having an identifier "i", "i+number of DAs", "i+2*total number of DAs", and so on (e.g. more generally each device having an identifier="i+(n*total number of DAs)", where n is an integer multiple, n>0).

To illustrate, reference is made to FIG. 13 for a simplified case of 3 DAs. Each DA performs processing for those devices for which an "X" is denoted in the DA's row in order to provide for a round robin style association of devices to DAs. For example, DA 1 may perform processing for devices 1, 4, 7, and so on, DA 2 may perform processing for devices 2, 5, and so one, and DA 3 may perform processing for devices 3, 6, and so. Other embodiments may use other techniques to partition the logical and physical devices among the DAs for processing.

Accordingly, for each sampling period for which activity information is determined in accordance with techniques herein for logical and physical devices in a system, such processing may be performed in a distributed fashion by DAs in the system as described above. When a DA performs such processing for a thin device, such processing may include determining extent and sub extent activity information as well as thin pool information for the thin device.

Figure 14:
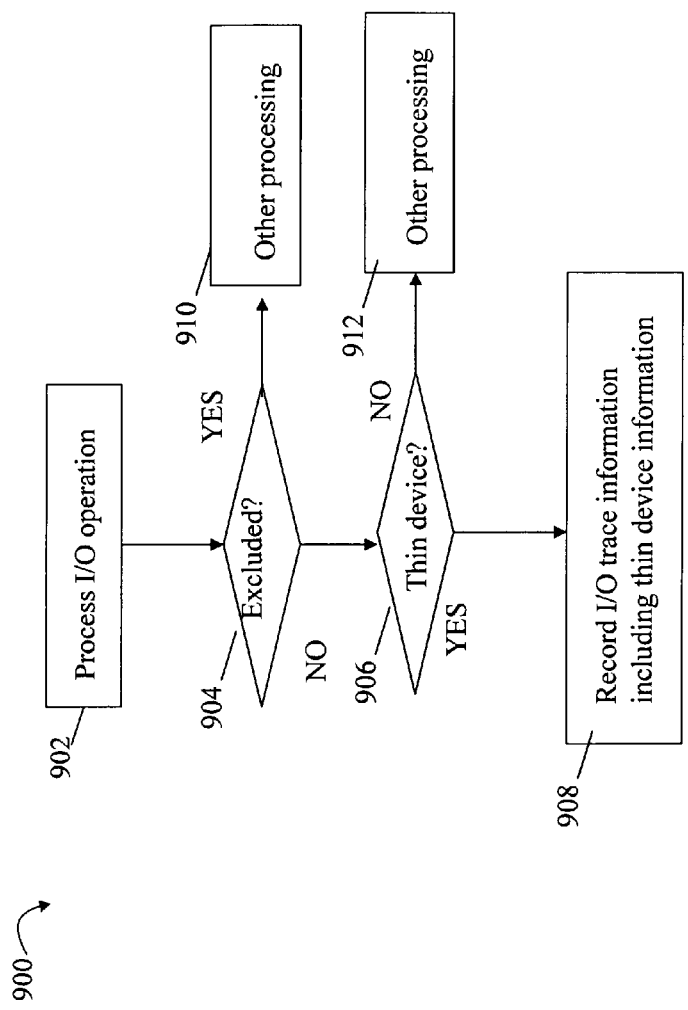
Figure 15:
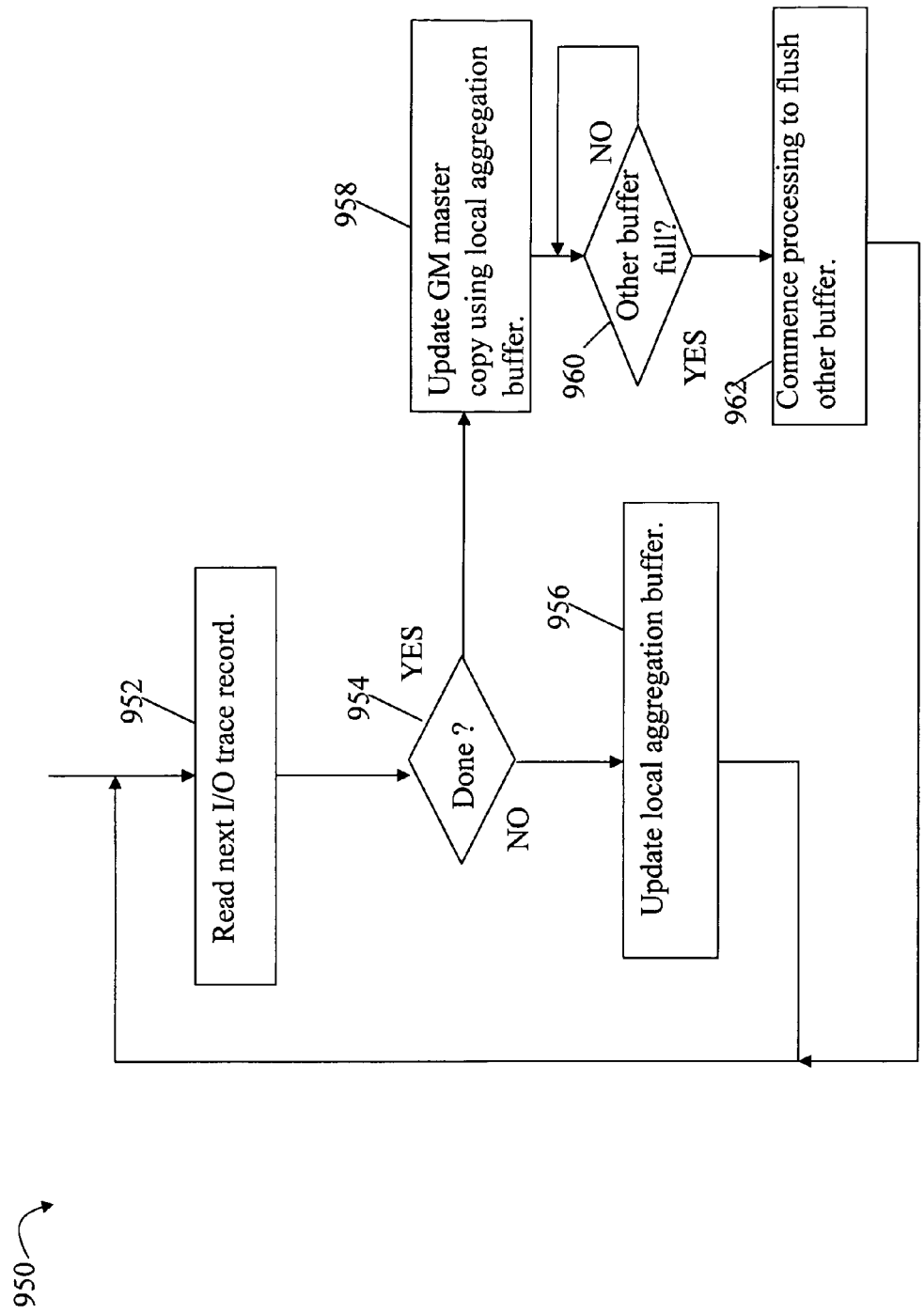
Figure 16:
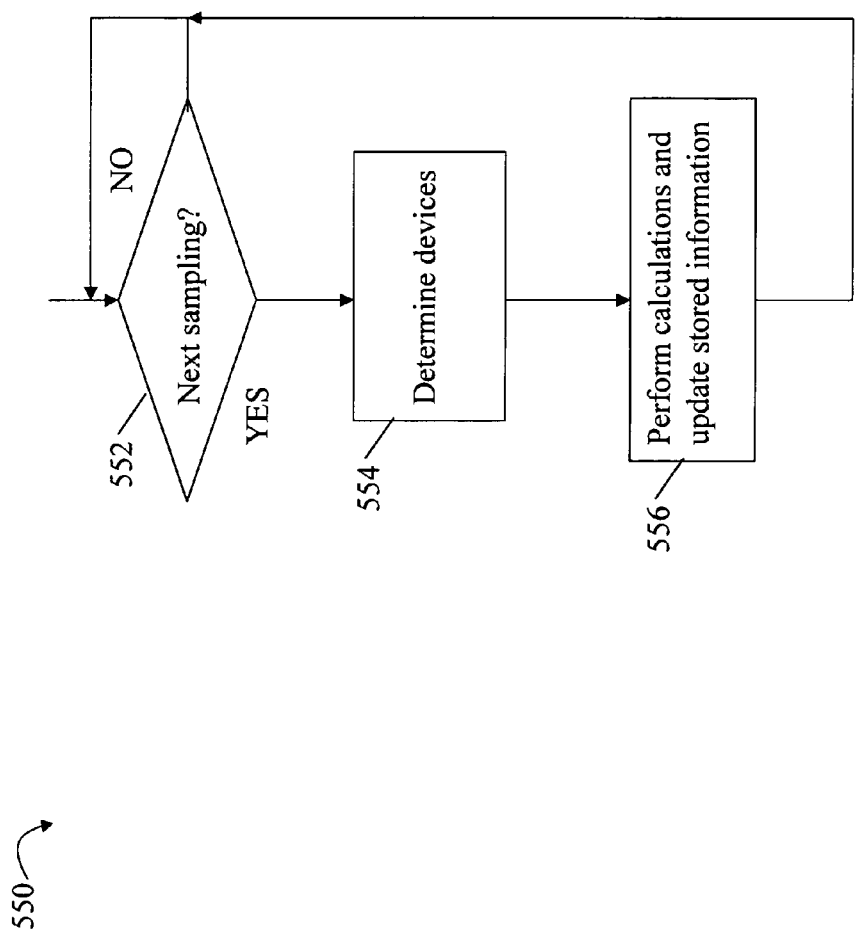

Referring to FIGS. 14-16, shown are flowcharts of processing steps that may be performed in an embodiment in accordance with techniques herein. FIGS. 14-16 summarize processing described above as may be performed in an embodiment in accordance with techniques herein.

Referring to FIG. 14, shown is a flowchart of processing steps as may be performed by each DA in connection with recording I/O trace information used for thin devices. At step 900, an I/O is processed by the DA. At step 904, a determination is made as to whether the I/O is to be excluded from those counted for thin devices. If so, control proceeds to step 910 to perform other processing. If step 904 evaluates to yes, control proceeds to step 906 where a determination is made as to whether this I/O is for a thin device. If not, control proceeds to step 912 to perform other processing as may be associated with the I/O such as, for example, in connection with other devices. If step 906 evaluates to yes, control proceeds to step 908 to record I/O trace information for the I/O operation. The I/O trace information may include thin device information as described above. The steps of 900 may be performed for each I/O operation directed to a physical device serviced by the DA.

Referring to FIG. 15, shown is a flowchart of processing steps as may be performed by each DA in connection with flushing a DA's full buffer of I/O trace information. As noted above, a DA may use two buffers for I/O trace records—a first buffer to which I/O trace records are written and a second buffer from which I/O trace records are flushed and further processed to generated DA-local aggregation information. At step 952, the next I/O trace record is read from the second buffer. At step 954 a determination is made as to whether the entire second buffer has been processed. It not, control proceeds to step 956 to update the DA's local aggregation buffer based on the current I/O trace record. Control then proceeds to step 952 to process the next record from the second buffer. If step 954 evaluates to yes, control proceeds to step 958 where processing is performed to update the GM master copy of activity information for thin devices using the information contained in the local aggregation buffer. At step 960 a determination is made as to whether the remaining first buffer is now full. If so, control proceeds to step 962 and then step 952 to commence processing to flush the first buffer and use the second buffer for writing new I/O trace records. If step 960 evaluates to no, processing waits until the first buffer currently used by the DA for writing I/O trace records is full. The processing of FIG. 15 may be performed with respect to the two buffers and repeatedly swapping which buffer is written to and which buffer is flushed.

Referring to FIG. 16, shown is a flowchart of processing steps that may be performed by each DA in an embodiment in accordance with techniques herein. At step 552, the DA determines whether the next sampling period for which activity information is determined has arrived. If not, processing waits at step 552 until such time occurs. At step 554, the DA determines the logical and physical devices for which is performs processing to obtain activity information. At step 556, the DA performs processing for those devices determined in step 554 and updates stored activity information such devices. Control proceeds to step 552 to wait for the next sampling period.

Figure 17:
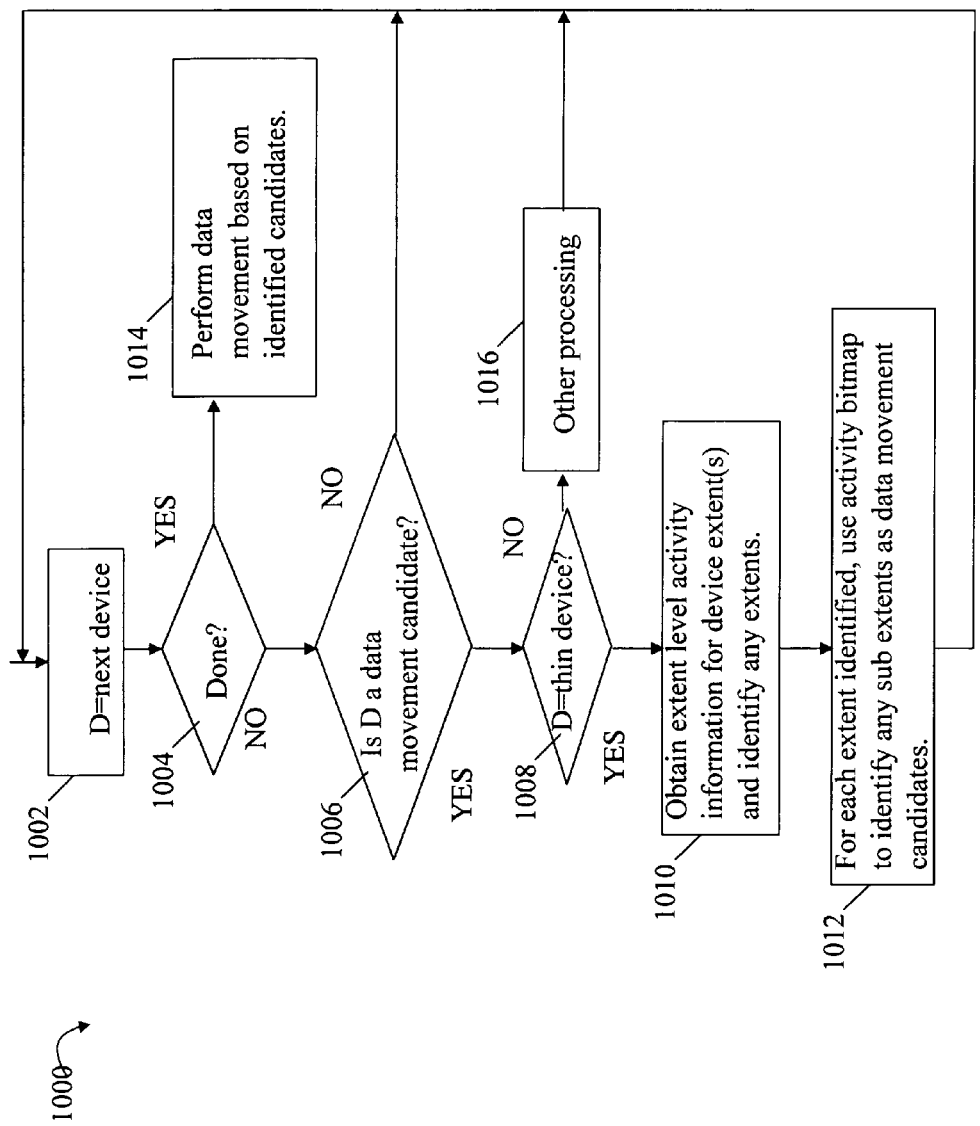

Referring to FIG. 17, shown is a flowchart of processing steps that may be performed in an embodiment in accordance with techniques herein to identify data movement candidates. The processing of flowchart 1000 operates on list of devices. In one embodiment, the list may include logical devices such as LVs and thin devices as described herein. In another embodiment, the list of devices may include logical devices and also physical devices. At step 1002, the next device on the list is selected as denoted by "D" in FIG. 17. At step 1004, a determination is made as to whether all devices in the list have been processed. If so, control proceeds to step 1014 to perform any one or more data movements in accordance with the identified data movement candidates based on flowchart 1000 processing. If step 1004 evaluates to no, control proceeds to step 1006 where a determination is made as to whether the current device D is a data movement candidate. Step 1006 may be performed, for example, by examining device level activity information for D. A device may be identified as a candidate, or as including portions thereof which are candidates, for data movement in a variety of different ways in an embodiment. For example, an embodiment may establish and utilize one or more threshold levels of activity to be considered a candidate for data movement in connection with promotion and/or demotion. If step 1006 evaluates to no, control proceeds to 1002. If step 1006 evaluates to yes, control proceeds to step 1008 where a determination is made as to whether D is a thin device. If step 1008 evaluates to no, control proceeds to step 1016 to perform other processing for non-thin devices and then to step 1002. If step 1008 evaluates to yes, control proceeds to step 1010 to obtain extent level activity information for the device's one or more extents. Such extent level activity information is described herein and may be used in connection with identifying any extents which are candidates for data movement, or which may contain portions thereof which may be data movement candidates. At step 1012, for each extent identified in step 1010, the extent's activity bitmap may be used to identify any sub extents as data movement candidates. In connection with steps 1010 and 1012, an embodiment may establish and utilize one or more threshold levels of activity used to determine whether an extent and/or sub extent is a candidate for data movement in connection with promotion and/or demotion. From step 1012, processing may continue with step 1002 with the next device in the list.

FIG. 17 illustrates one way in which different levels of activity information, such as for thin devices alone or in combination with other devices, may be used to identify data movement candidates in a hierarchical manner. In connection with thin devices, device level activity information may be first examined to identify thin devices as data movement candidates. Extent level activity information of identified thin devices may be subsequently used to identify extents of interest as data movement candidates. Subsequently, activity bitmaps of identified extents may be used to identify sub extents of interest as data movement candidates.

As mentioned above, an embodiment may be use the techniques described herein alone or in combination with other techniques. For example, an embodiment may use the techniques described herein alone, or in combination with a technique to evaluate which device's data, or portion(s) thereof, should reside on physical storage of different tiers based on performance goals. For example, an embodiment may use the techniques herein in combination with the techniques described in U.S. patent application Ser. No. 12/803,571, filed on Jun. 30, 2010, TECHNIQUES FOR AUTOMATED EVALUATION AND MOVEMENT OF DATA BETWEEN STORAGE TIERS, which is incorporated by reference herein, for performing a determination based on performance goals in evaluating whether to locate data in a flash or non-flash-based storage tier.

In an embodiment, the techniques described herein may be used in connection with a Fully Automated Storage Tiering (FAST) product produced by EMC Corporation of Hopkinton, Mass., that provides for the optimization of the use of different storage tiers including the ability to easily create and apply tiering policies to transparently automate the control, placement, and movement of data within a storage system based on business needs. An embodiment may also use techniques described in U.S. patent application Ser. No. 12/798,097, filed Mar. 30, 2010, ANALYSIS TOOL FOR A MULTI-TIER STORAGE ENVIRONMENT, which is incorporated by reference herein.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for tracking and using activity information for one or more logical devices comprising:
partitioning each of said one or more logical devices into one or more extents, each of said one or more extents including a plurality of sub extents, each of said sub extents including a plurality of chunks;
determining, for each of said one or more extents of each of said one or more logical devices, extent activity level information including one or more metrics indicating an activity level for said each extent;
determining, for each of said one or more extents of each of said one or more logical devices, an activity bitmap, said activity bitmap including an entry for each sub extent included in said each extent, said entry indicating an activity level for said each sub extent; and selecting a first sub extent of a first extent of a first of the one or more logical devices as a candidate for data movement using said extent activity level information and said activity bitmap for said first extent, said data movement being any of demotion from a first storage tier to a second storage tier whereby the first storage tier is a higher performance tier than said second storage tier, and promotion from the second storage tier to the first storage tier, said first storage tier including physical storage devices of a first storage type and said second storage tier including physical storage devices of a second storage type different than the first storage type, wherein a physical storage device of the first storage type provides higher performance than a physical storage device of the second storage type.

2. The method of claim 1, wherein each of said one or more logical devices is a thin device having a storage capacity wherein storage is unallocated for at least a first portion of said storage capacity at a point in time, said first portion corresponding to a range of addresses of said thin device not mapped to physical storage.

3. The method of claim 1, wherein said extent activity level information includes short term activity information and long term activity information.

4. The method of claim 3, wherein said short term activity information includes a first metric determined using a first decay coefficient providing a rate of decay for an activity level determined at a point in time, and said long term activity information includes a second metric determined using a second decay coefficient providing a rate of decay for an activity level determined at a point in time.

5. The method of claim 4, wherein said first decay coefficient specifies a shorter rate of decay than said second decay coefficient.

6. The method of claim 3, wherein said short term activity information and said long term activity information each include a read miss rate, a write rate, and a prefetch rate.

7. The method of claim 6, wherein said short term activity information and said long term activity information are determined based on a number of operations performed by a device interface which accesses physical devices.

8. The method of claim 1, wherein said first sub extent has data stored on the first storage tier and a second sub extent of the first extent has data stored on a second storage tier.

9. The method of claim 1, wherein the first sub extent is identified as a candidate for movement from the second storage tier to the first storage tier.

10. The method of claim 1, wherein the first sub extent is identified as a candidate for movement from the first storage tier to the second storage tier.

11. The method of claim 1, further comprising determining device activity level information for each of said one or more logical devices, wherein said device activity level information for each of said one or more logical devices is used to identify said first logical devices for data movement, said extent activity level information for each extent of said first logical device is used to identify said first extent for data movement, and said activity bitmap for said first extent is used to identify one or more sub extents, including the first sub extent, of said first extent for data movement.

12. The method of claim 2, wherein said logical devices have data stored on a plurality of physical devices included in a data storage system having a plurality of device interfaces, and for each of said device interfaces processing an I/O operation directed to a thin device, said each device interface writes an I/O trace record including thin device information for the I/O operation in a first buffer included in memory local to said each device interface.

13. The method of claim 12, wherein, when said first buffer is full, said each device interface performs processing to flush a plurality of I/O trace records from said first buffer and aggregate activity information of said device interface for one or more thin devices as determined in accordance with said plurality of I/O trace records.

14. The method of claim 13, wherein said each device interface updates a master copy of activity information in global memory in accordance with said activity information of said device interface, said master copy including activity information for said plurality of device interfaces.

15. The method of claim 2, wherein, at each sampling period for which activity information is updated for said one or more logical devices, each of said plurality of device interfaces performs processing for a portion of said one or more logical devices.

16. A data storage system comprising:
a plurality of physical devices;
a plurality of logical devices mapped to portions of said physical devices, wherein said plurality of logical devices includes one or more thin devices, each of said thin devices being partitioned into one or more extents, each of said extents being partitioned into one or more sub extents;
a plurality of device interfaces used to access said plurality of physical devices;
a global memory accessible to said plurality of device interfaces; and
wherein each of said plurality of device interfaces services I/Os for a portion of said physical devices, each of said device interfaces including a memory comprising code stored thereon for:
recording first information for each I/O serviced by said each device interface for one of said plurality of thin devices;
aggregating said first information for a plurality of I/Os serviced by said each device interface and producing local aggregation information;
updating a portion of said global memory including second information, said second information comprising local aggregation information for said plurality of device interfaces;
processing, at each sampling period, a portion of said second information corresponding to a portion of said plurality of thin devices to produce activity information;
determining, for each of said one or more extents of each of the plurality of logical devices, extent activity level information and an activity bitmap including an entry for each sub extent in said each extent; and
selecting a first sub extent of a first extent of a first of the plurality of logical devices as a candidate for data movement using said extent activity level information and said activity bitmap for said first extent, said data movement being any of demotion from a first storage tier to a second storage tier whereby the first storage tier is a higher performance tier than said second storage tier, and promotion from the second storage tier to the first storage tier, said first storage tier including physical storage devices of a first storage type and said second storage tier including physical storage devices of a second storage type different than the first storage type, wherein a physical storage device of the first storage type provides higher performance than a physical storage device of the second storage type.

17. The data storage system of claim 16, wherein said extent activity level information includes short term activity information and long term activity information, said short term activity information includes a first metric determined using a first decay coefficient providing a rate of decay for an activity level determined at a point in time, and said long term activity information includes a second metric determined using a second decay coefficient providing a rate of decay for an activity level determined at a point in time.

18. The data storage system of claim 16, wherein each of said sub extents corresponds to a portion of a physical device and represents a smallest amount considered as a data movement candidate, said data storage system including a plurality of storage tiers, each of said plurality of storage tiers having physical devices of different performance characteristics and including at least the first storage tier and the second storage tier wherein said first sub extent is included on one of said plurality of thin devices and is a data movement candidate having a first portion of data stored on a physical device of said first storage tier and a second portion of data stored on a physical device of said second storage tier and wherein, when said first sub extent is selected as a candidate for promotion to said first storage tier, said second portion is moved to a physical device of said first storage tier, and when said first sub extent is selected as a candidate for demotion to said second storage tier, said first portion is moved to a physical device of said second storage tier.

19. A non-transitory computer readable medium comprising code stored thereon for tracking and using activity information for one or more logical devices, the non-transitory computer readable medium comprising code stored thereon for:

partitioning each of said one or more logical devices into one or more extents, each of said one or more extents including a plurality of sub extents, each of said sub extents including a plurality of chunks;

determining, for each of said one or more extents of each of said one or more logical devices, extent activity level information including one or more metrics indicating an activity level for said each extent;

determining, for each of said one or more extents of each of said one or more logical devices, extent activity bitmap, said activity bitmap including an entry for each sub extent included in said each extent, said entry indicating an activity level for said each sub extent; and selecting a first sub extent of a first extent of a first of the one or more logical devices as a candidate for data movement using said extent activity level information and said activity bitmap for said first extent, said data movement being any of demotion from a first storage tier to a second storage tier whereby the first storage tier is a higher performance tier than said second storage tier, and promotion from the second storage tier to the first storage tier, said first storage tier including physical storage devices of a first storage type and said second storage tier including physical storage devices of a second storage type different than the first storage type, wherein a physical storage device of the first storage type provides higher performance than a physical storage device of the second storage type.

20. The method of claim 1, wherein physical devices of the second storage tier are solid state storage devices and physical devices of the first storage tier are non-solid state storage devices.

* * * * *